(12) United States Patent
Okamoto et al.

(10) Patent No.: US 7,018,190 B2
(45) Date of Patent: Mar. 28, 2006

(54) RESIN MULTILAYER MOLDING METHOD AND MULTILAYER MOLDING DEVICE

(75) Inventors: Akio Okamoto, Ube (JP); Etsuo Okahara, Ube (JP)

(73) Assignee: Ube Industries, Ltd., Ube (JP)

( * ) Notice: Subject to any disclaimer, the term of this patent is extended or adjusted under 35 U.S.C. 154(b) by 424 days.

(21) Appl. No.: 10/326,166

(22) Filed: Dec. 23, 2002

(65) Prior Publication Data

US 2003/0091675 A1  May 15, 2003

Related U.S. Application Data

(62) Division of application No. 09/569,008, filed on May 11, 2000, now Pat. No. 6,517,755, which is a division of application No. 09/118,019, filed on Jul. 17, 1998, now abandoned.

(30) Foreign Application Priority Data

Jul. 18, 1997   (JP)   .................................. 9-193889

(51) Int. Cl.
 *B29C 45/16*   (2006.01)
(52) U.S. Cl. ........................ 425/127; 425/140; 425/142
(58) Field of Classification Search ................ 425/127, 425/129.1, 140, 145, 150, 143
See application file for complete search history.

(56) References Cited

U.S. PATENT DOCUMENTS

| | | | |
|---|---|---|---|
| 4,948,548 A | 8/1990 | Hanstein et al. | ............. 264/522 |
| 5,002,706 A | 3/1991 | Yamashita | .................... 264/2.2 |
| 5,088,911 A * | 2/1992 | Kumazaki | .................... 425/145 |
| 5,176,858 A | 1/1993 | Tsukabe et al. | ............. 264/40.1 |

(Continued)

FOREIGN PATENT DOCUMENTS

EP   0997256 A1   5/2000

(Continued)

OTHER PUBLICATIONS

European Search Report dated Aug. 12, 2004.

*Primary Examiner*—Duane Smith
*Assistant Examiner*—Emmanuel S. Luk
(74) *Attorney, Agent, or Firm*—Armstrong, Kratz, Quintos, Hanson & Brooks, LLP

(57) ABSTRACT

A resin multilayer molding method in which a skin material having a resin decorating layer on a surface and a core-material resin are integrally molded in a mold, comprising the steps of: presetting a relationship of a glass transition point (Tgs) of the resin decorating layer of the skin material and a supply temperature (Tc) of a molten resin forming a core material to satisfy Tgs<Tc, and performing molding on a condition that a maximum temperature (Tsm) of the resin decorating layer of the skin material during clamping satisfies Tsm>Tgs. When a temperature of the resin decorating layer of the skin material reaches a previously estimated and set value (Tsd) so that a temperature Tsc, which temperature of the resin decorating layer reaches by rising again after an air insulating layer is formed, satisfies Tsc≧Tgs on the basis of a correlation between a temperature of the core-material resin during clamping and forming and retaining the air insulating layer and a temperature of the skin material decorating layer, the gap is made between the resin decorating layer of the skin material and the mold cavity surface opposed to the resin decorating layer to form and retain the air insulating layer. By this, remarkably high-quality resin multilayer molded products can be stably supplied at low cost without impairing surface decorating performance.

9 Claims, 16 Drawing Sheets

U.S. PATENT DOCUMENTS

| | | | | |
|---|---|---|---|---|
| 5,395,565 | A | 3/1995 | Nagaoka et al. | 264/40.5 |
| 5,547,619 | A | 8/1996 | Obayashi | 264/40.1 |
| 5,702,666 | A | 12/1997 | Hatakeyama et al. | 264/544 |
| 5,772,932 | A | 6/1998 | Kamiguchi et al. | 264/40.5 |
| 5,830,402 | A | 11/1998 | Harada et al. | 264/266 |
| 6,331,263 | B1 * | 12/2001 | Abe et al. | 264/40.5 |
| 2002/0014709 | A1 * | 2/2002 | Arai | 264/40.6 |

FOREIGN PATENT DOCUMENTS

| | | |
|---|---|---|
| JP | 59-150740 | 8/1984 |
| JP | 64-63111 | 3/1989 |
| JP | 1-235613 | 9/1989 |
| JP | 2-253930 | 10/1990 |
| JP | 3-34830 | 2/1991 |
| JP | A-3-57611 | 3/1991 |
| JP | 3-162916 | 7/1991 |
| JP | 6-234133 | 8/1994 |
| JP | 6-297489 | 10/1994 |
| JP | 10-058485 | 3/1998 |

* cited by examiner

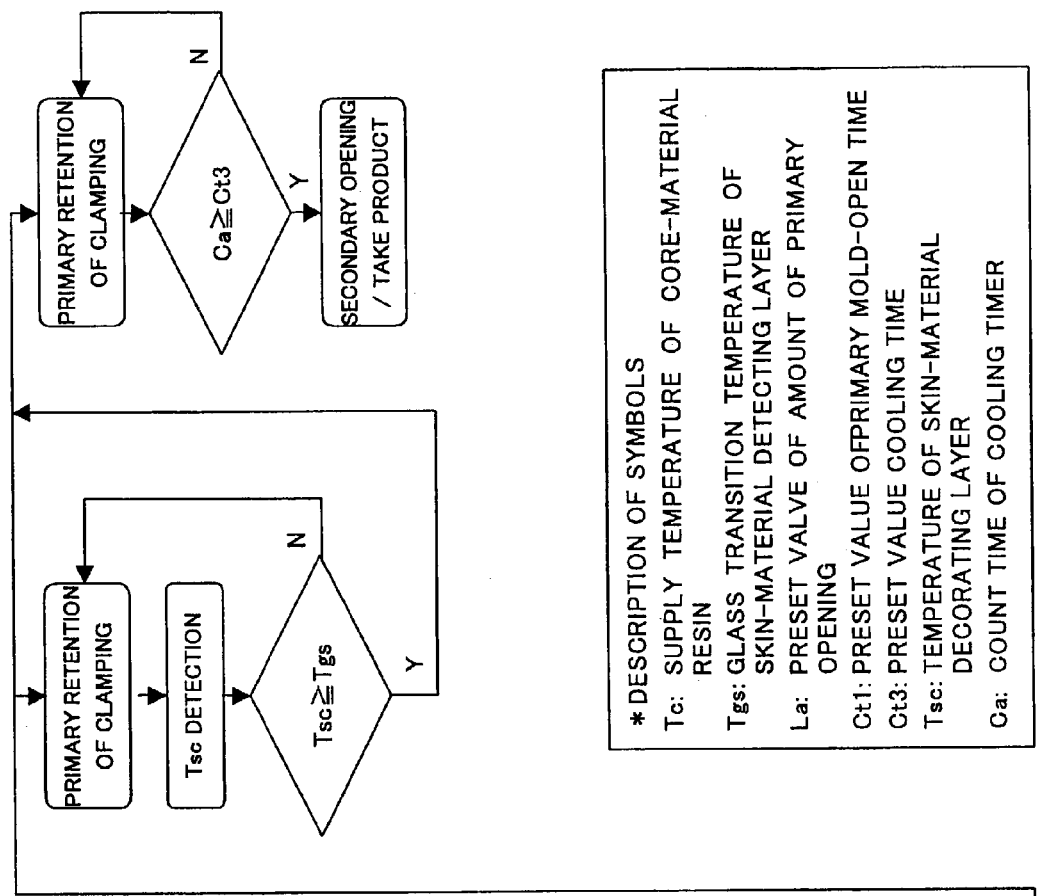
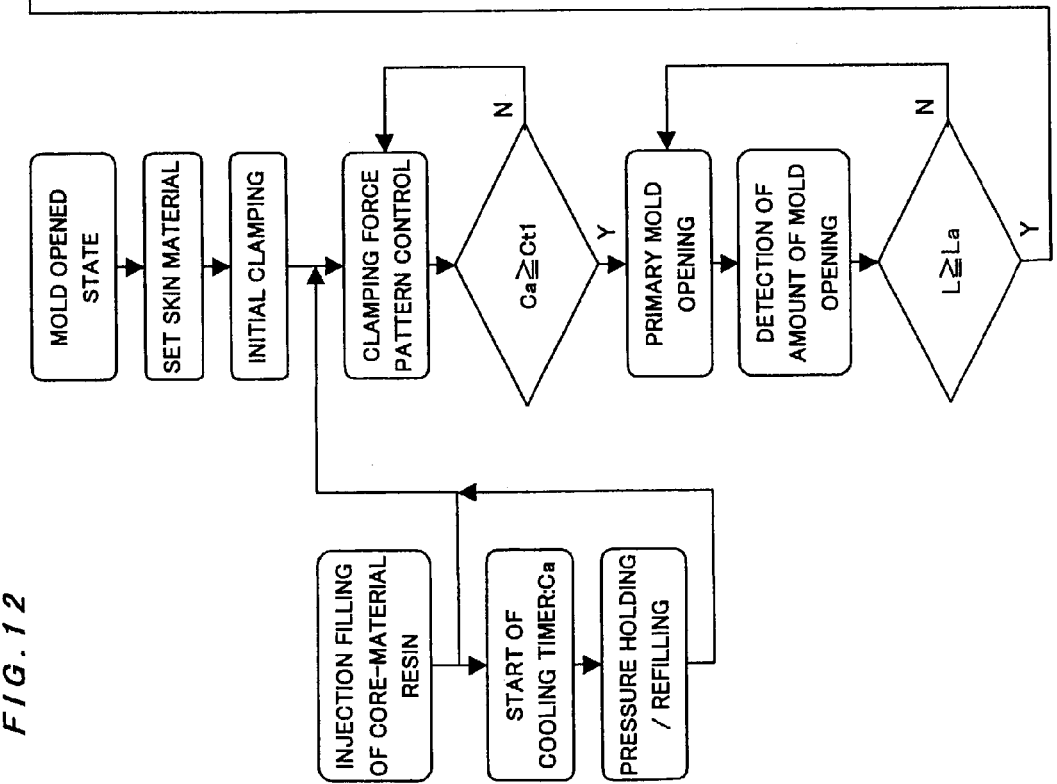
FIG. 12

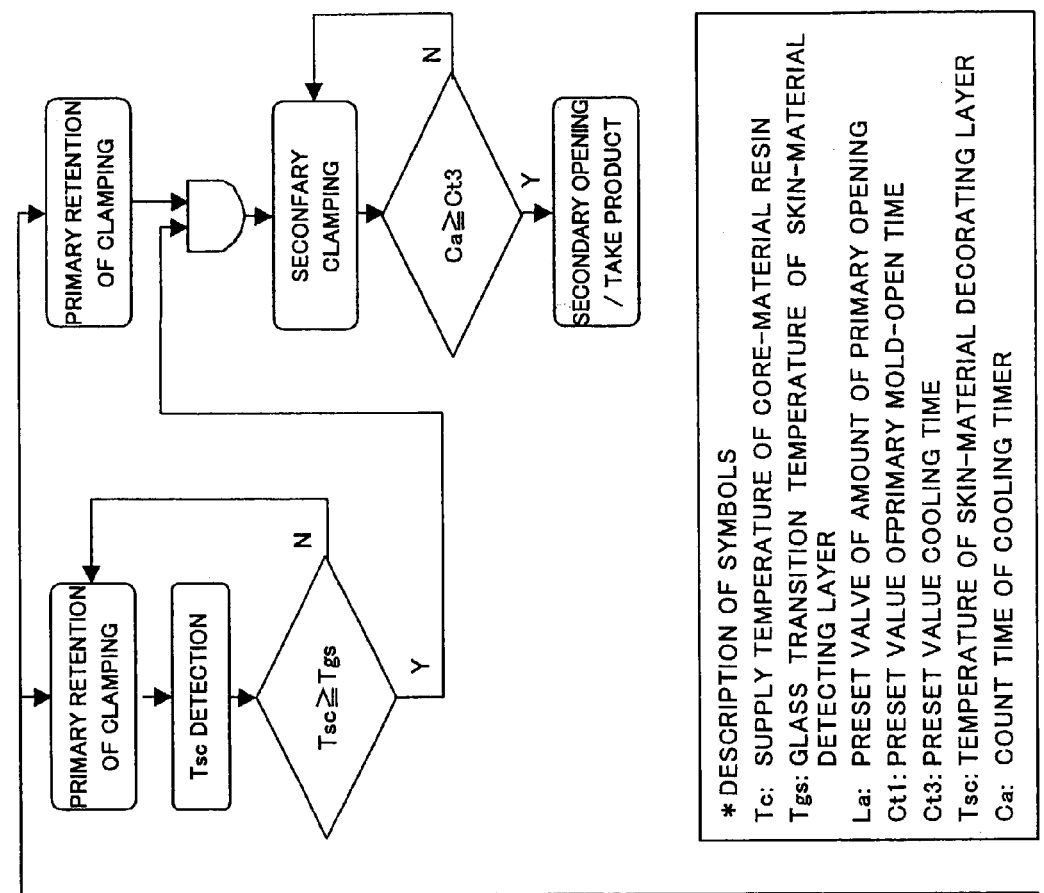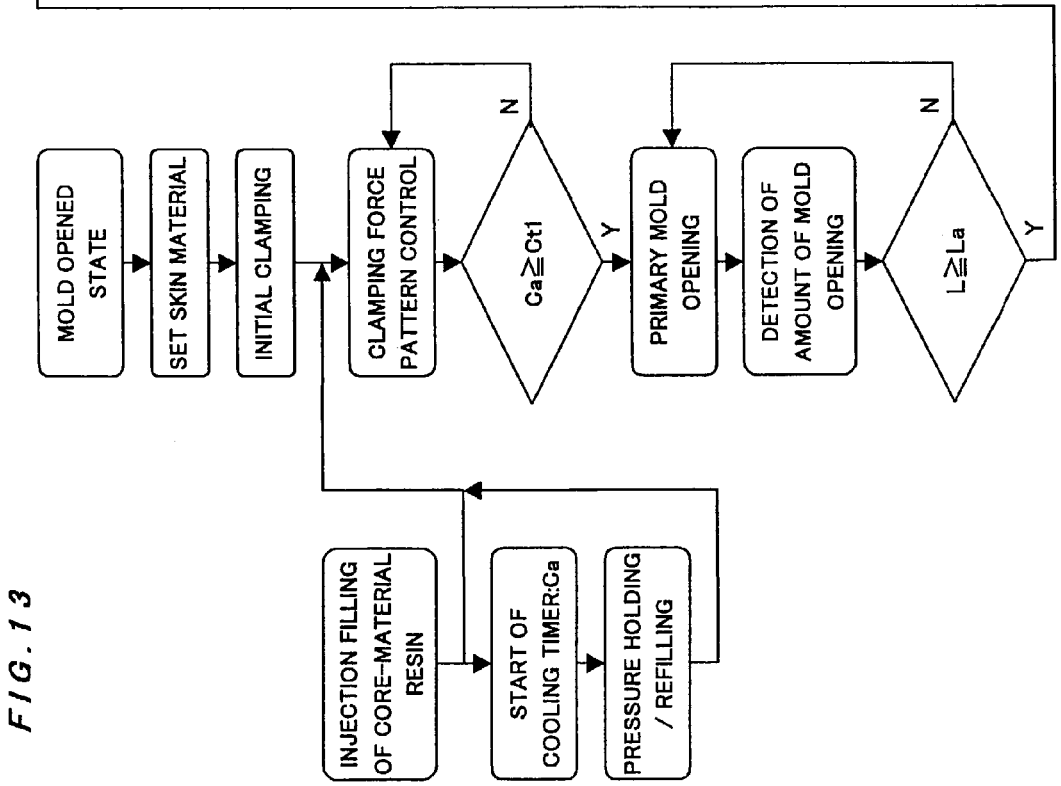
FIG. 13

RESIN MULTILAYER MOLDING METHOD AND MULTILAYER MOLDING DEVICE

CROSS-REFERENCE TO RELATED APPLICATIONS

This application is a division of prior application Ser. No. 09/569,008 filed May 11, 2000 with now U.S. Pat. No. 6,517,755.

This is a continuation-in-part application of Ser. No. 09/118,019 filed Jul. 17, 1998, now abandoned.

BACKGROUND OF THE INVENTION AND RELATED ART

The present invention relates to a resin multilayer molding method and a multilayer molding device in which a skin material having a resin decorating layer on a surface and a core-material resin are integrally molded in a mold.

Recently, for resin molded products for use in automobile, household appliances, building materials, and the like, in order to enhance a surface decorative quality by applying added values such as decorativeness, good feel, cushioning properties, and the like and to reduce costs by saving molding processes, resin multilayer molding has been performed in which a decorating skin material having surface decorating performance such as the decorativeness, the good feel, the cushioning properties, and the like is integrally formed on a surface of a core resin using injection molding or press molding as described later in a mold simultaneously with molding of the core resin.

After the decorating skin material is set between opened mold pieces, in a clamped sate in which a clamping force is exerted by closing the mold or in a clamped state in which a specified mold open quantity is kept between the mold pieces, a mold cavity space formed by the decorating skin material and the mold is filled with a core material or molten resin by an injection device, a resin supply unit, or the like. After the filling of the core-material resin, the mold is loaded with a follow-up pressure by the injection device or the clamping device to integrally mold the decorating skin material and the core-material resin, and the mold is opened after an elapse of a predetermined cooling time to take a molded product therefrom.

However, the decorating skin material is largely damaged by loading of high temperature and pressure by the core-material resin from when the mold is filled with the core material or molten resin till the mold is opened to take out the molded product. A problem is caused that even when the decorating skin material with a foaming layer laminated on its back surface is used aiming at, for example, softness and cushioning properties, the foaming layer collapses during molding, and the softness, the cushioning properties, or another expected surface decorating performance cannot be obtained.

Another problem is caused that even when the decorating skin material provided with a gigging layer on its surface is used aiming at, for example, good feel and high grading, the gigging layer falls during molding, and the good feel, the high grading, or another expected surface decorating performance cannot be obtained.

Further problem is caused that even when the decorating skin material with a printed or painted layer laminated on its surface is used aiming at, for example, decorativeness or painting properties, microfine scratches made in the manufacture process of the skin material or microfine strains made at the time of deformation along a mold configuration during molding cannot be avoided, which results in surface defects such as tarnish, color shading, and the like. The decorativeness, the painting properties, or another expected surface decorating performance cannot be obtained.

As aforementioned, even when the decorating skin material is used for the purpose of enhancement of the added values such as decorativeness, good feel, cushioning properties, and the like, the originally targeted surface decorating performance cannot be obtained.

Means for solving the above-mentioned problems include a method in which a decorating skin material with a film having heat/pressure resistance or another protective layer laminated thereon is used. The method is designed to moderate influences of heat and pressure loads from the core-material resin during molding with the protective layer, but the manufacture cost of the decorating skin material is increased, the decorating skin material is only incompletely protected, and the target surface decorating performance cannot be satisfied.

As another means for solving the above-mentioned problem, in the case where the printed or painted layer is laminated on the surface of the decorating skin material aiming at decorativeness and painting properties, the decorating skin material is outlined/performed into a molded product configuration at a high temperature before molding. In this method, in the preforming process at the high temperature, the microfine scratches made in the manufacture process of the skin material or the microfine strains made at the time of deformation along the mold configuration during molding can be avoided to some degree, but incompletely. Furthermore, since the preforming process is added and a separate preforming facility is necessary, the cost of resin multilayer molding and the space for performing the molding are increased.

As new means for solving the above-mentioned problems, Japanese Patent Application Laid-open No. 150740/1984 proposes a low-pressure molding method in which the pressure loaded to the decorating skin material is minimized during the resin multilayer molding using press molding. Moreover, for example, Japanese Patent Application Laid-open No. 297489/1994 proposes a molding method in which the temperature of core-material molten resin is lowered, the pressure loaded on the decorating skin material is reduced, and the product of the pressure loaded on the decorating skin material during molding and pressure loaded time is further minimized. Both proposals are designed to suppress the damage of the decorating skin material being molded by reducing influences of pressure and heat loaded on the decorating skin material.

However, even if the damage of the decorating skin material can be suppressed by reducing the pressure loaded on the decorating skin material or reducing the product of pressure and time, a moldable, necessary minimum pressure exists for molding of the core-material resin. Consequently, a shortage of molding pressure of the core-material resin causes deformation, warpage, short shot, or other molding defects in view of products.

Moreover, in the method in which the temperature of the core-material molten resin is lowered, since the fluidity of the core-material resin is extremely lowered, the pressure at the time of molding of the core-material resin is extremely lowered, the pressure at the time of molding of the core-material molten resin (filling and flowing pressures) is inevitably enlarged, and the pressure loaded on the decorating skin material fails to drop. As a result, the molding method is a contradictory (actually invalid) proposal. Even if the method can be realized, the shortage of molding pressure of the core-material resin causes deformation, warpage, short shot, or other molding defects in view of products.

To perform molding by minimizing the loaded pressure and heat influences is certainly desirable in order to control the damage of the decorating skin material during molding, but this is a molding condition in which molding cannot be performed in view of the moldability of the core-material resin. Specifically, in the resin multilayer molding of resin using the decorating skin material, contradictory molding controls for preventing the decorating skin material from being damaged and for enhancing the moldability of the core-material resin have to be simultaneously performed during molding. Not only in the case where the conventional injection molding and press molding are used, but also in the molding control simply using the proposed low-pressure molding, molding cannot be performed with both controls being compatible.

Therefore, an object of the present invention is to provide a resin multilayer molding method and a multilayer molding device which can solve the conventional problems described above.

Another object of the present invention is to provide a resin multilayer molding method and a multilayer molding device which can supply remarkably high-quality resin multilayer molded products stably at low cost without impairing surface decorating performance.

SUMMARY OF THE INVENTION

According to the present invention, it is provided a resin multilayer molding method in which a skin material having a resin decorating layer on a surface and a core-material resin are integrally molded in a mold, comprising the steps of:

presetting a relationship of a glass transition point (Tgs) of the resin decorating layer of the skin material and a temperature (Tc) of a supplied molten resin forming a core material to satisfy Tgs<Tc, and molding a molten resin and the skin material under a condition that a maximum temperature (Tsm) of the resin decorating layer of the skin material during mold clamping satisfies Tsm>Tgs; and making a gap between the resin decorating layer of the skin material and a mold cavity surface opposed to the resin decorating layer to form and retain an air insulating layer therebetween, at a time when a temperature of the resin decorating layer of the skin material reaches a point within a preset value which is so estimated that a temperature (Tsc) which the resin decorating layer of the skin material reaches as a result of raising again after forming an air insulating layer satisfies Tsc≧Tgs based on a relative between a temperature of the molten resin forming a core material and a temperature of the resin decorating layer of the skin material during the formation and the retention of the air insulating layer as well as clamping.

A technical concept of the present invention is hereinbelow described. In the present invention, a resin decorating layer damaged during clamping is recovered by elastic force of the resin in the same mold. That is, for recovering the damaged resin decorating layer by elastic force of the resin, it is necessary to make a temperature of the resin decorating layer higher than the maximum temperature which the resin decorating layer reaches during clamping under the condition that a clamping force is eliminated and a recovery space (gap) for the damage between the resin decorating layer and the mold cavity surface opposed to the resin decorating layer is retained. Heat transfer between the metal-mold cavity surface on the side of the resin decorating layer and the resin decorating layer is intercepted by arranging the above recovery space during cooling the core material resin, and heat-removing of the resin decorating layer from the mold almost stops. On the other hand, the core-material resin still has sufficient heat capacity, and the resin decorating layer is heated again to reach a temperature higher than the maximum temperature which the resin decorating layer reaches during mold clamping. Therefore, the resin decorating layer damaged during clamping can be self-restored by elastic force of the resin. That is, the maximum characteristic of the present invention is that a temperature of the resin decorating layer rises again by providing a gap of a mold during molding after the completion of clamping and reaches within a range where a damage caused during clamping can be self-restored by elastic force of the resin.

As described above, the present invention is a very inovational invention wherein opposite molding controls for increasing clamping ability of the core-material resin and for preventing damages on a decorative skin material can be simultaneously performed by separating a clamping process and a damage recovery process of a decorative skin material in resin multilayer molding in which a skin material having a resin decorating layer on a surface and a core-material resin are integrally molded in a mold.

The present invention can be also conducted by the use of a temperature of the core-material resin instead of a temperature of the skin material having a resin decorating layer (hereinbelow referred to simply as "skin material"). That is, a correlation between a temperature of the core-material resin during clamping and forming and retaining the air insulating layer and a temperature of the skin material (corresponding to FIG. 3 of Japanese Patent Application 9-193889) is determined in advance, and a timing of forming the air insulating layer can be controlled by the use of a temperature of the core-material resin instead of a temperature of the resin decorating layer of the skin material. Further, a timing of forming the air insulating layer can be controlled on the basis of the time elapsed from a datum point from a correlation between the temperature of the core-material resin and the temperature of the skin-material decorating layer. That is, the estimation of this timing can be achieved, for example, by predicting how long it takes from the initiation of injection until the temperature of the skin-material decorating layer reaches aimed range from the above-mentioned relation.

The aforementioned explanation is on the best embodiment which completely recovers a damaged skin material. Further, an effective range of the present invention is not limited to the aforementioned range. That is, a considerable effect (a damage can be recovered) is obtained if a temperature of the skin material increases to a glass transition point or higher by providing an insulating layer even if the temperature of the skin material does not reach the maximum temperature which the skin material reaches during clamping. Further, it shows an effect of recovering a damage if a temperature of the skin material after rising again is near the glass transition point even if the temperature is lower than the glass transition point.

In the present invention, a molded article having a faithfully transcribed mold cavity surface on a surface of the skin material can be obtained by closing the mold to eliminate the air insulating layer and retained under pressure within a temperature range in which the temperature (Tsc) of the resin decorating layer of the skin material satisfies Tsc≧Tgs at a preset arbitrary time after the air insulating layer is formed. That is, Tsc receives heat from the core resin during clamping and rises. However, when the temperature becomes higher than a temperature of the mold, heat transfer to the mold starts. Therefore, Tsc does not rise far above the temperature of the mold. This tendency is more remarkable on the surface which directly contacts the mold cavity surface than the other portions. On the other hand, since Tsc after the air insulating layer is formed retains the heat received from the core resin, Tsc rises almost independently of the temperature of the mold. Therefore, by being pressed with the mold being closed subsequently, transcription properties can be greatly improved since the mold cavity face is transcribed at a high temperature. In this case, since the mold cavity opposed to the skin material has an insulating structure, it is possible to maintain a temperature upon transcription from the beginning of pressing operation to the completion to be high, thereby giving a more preferable result. Since a temperature of the core resin is higher when the air insulating layer is formed in an earlier time in this molding method, Tsc after the insulating layer is formed also reaches high temperature, which is preferable for transcription. Because of this, it is preferable to arrange an air insulating layer at the time when filling of the resin in the cavity is completed independently of a temperature during clamping. Though the molded article is deformed by opening of the mold in this case, it does not cause any problem because the deformation is corrected by the clamping of the mold thereafter. In a molded article obtained by a method, a mirror polished surface without blur is faithfully transcribed when the cavity surface is a mirror polished, and a pattern of grain is faithfully transcribed when the mold cavity surface has grain.

Moreover, according to the present invention, it is provided a resin multilayer molding method in which a skin material having a resin decorating layer on a surface and a core-material resin are integrally molded in a mold, comprising the steps of:

at a preset arbitrary time after a molten resin forming a core material is supplied, and heating the resin decorating layer of the skin material up to the temperature Tgs or higher by using heating means incorporated inside the mold, or attached to the outside of the mold, or heating the resin decorating layer of the skin material to a glass transition point (Tgs) or a higher temperature by using a heating means incorporated inside the mold or a heating means attached outside the mold, and subsequently making a gap between the resin decorating layer of the skin material and a mold cavity face opposed to the resin decorating layer to form an air insulating layer, or forming the air insulating layer and subsequently heating the resin decorating layer of the skin material to Tgs or a higher temperature, or heating and simultaneously forming the air insulating layer, to retain the air insulating layer.

In the multilayer molding method, after the air insulating layer is formed, the resin decorating layer is heated up to Tgs or more using the heating means incorporated inside the mold or the heating means attached outside the mold, and then within a temperature range in which a temperature (Tsc) of the resin decorating layer of the skin material satisfies Tsc≧Tgs at a preset arbitrary time, the mold is preferably closed to eliminated the air insulating layer and retained under pressure, which gives a molded article having a faithful transcription of a mold cavity face on the surface of the skin material.

Additionally, in a case where injection molding is used as the molding method, after an injection filling condition for injection filling the molten resin forming the core material into a mold cavity space and refilling a cooling/setting shrinkage quantity, a clamping condition during injection filling, the thickness of the air insulating layer, a change-over timing condition for forming the air insulating layer, and a change-over timing condition for eliminating the air insulating layer are initially set as molding condition, trial molding and visual quality determination by an operator are performed. In a case where the molding conditions need to be changed based on visual quality determination results, the molding conditions are preferably corrected using a prepared correction program to set optimum molding conditions for preventing the resin decorating layer of the skin material being molded from being damaged.

Moreover, in the present invention, after the injection filling condition for injection filling the molten resin forming the core material into the mold cavity space and refilling the cooling/setting shrinkage quantity, the clamping condition during injection filling, the thickness of the air insulating layer, the change-over timing for forming the air insulating layer, the change-over timing for eliminating the air insulating layer, and a heating condition for using heating means to heat the resin decorating layer of the skin material are initially set as molding conditions, the trial molding and the visual quality determination by the operator are performed. In a case where the molding conditions need to be changed based on visual quality determination results, the molding conditions are preferably corrected using the prepared correction program to set optimum molding conditions for preventing the resin decorating layer of the skin material being molded from being damaged.

Furthermore, in the present invention, it is preferable that a minimum thickness (Lm) of the resin decorating layer of the skin material being molded, a thickness (Lf) of the resin decorating layer after molding which satisfies the required surface decorating performance of a multilayer molded product and a thickness La of the air insulating layer have a relationship Lf−Lm≦La.

Moreover, in the present invention, the skin material is preferably a lamination of a resin decorating layer which is formed by laminating a surface decorating layer portion constituted of a resin film, a resin woven fabric, a nonwoven fabric made of polymer fiber singly or in a combined manner and an intermediate decorating layer portion constituted of a foaming resin on a back surface of the surface decorating layer portion as needed in accordance with a surface decorating purpose, and a base layer constituted of a resin film, a woven fabric or a nonwoven fabric or a combination thereof as needed.

Additionally, it is preferable that-the temperature of the core-material resin and the temperature of the resin decorating layer of the skin material during molding are detected, while the change-over timing for forming the air insulating layer and the change-over timing for eliminating the air insulating layer are controlled with a detected temperature signal.

Furthermore, the change-over timing control for forming the air insulating layer and the change-over timing control for eliminating the air insulating layer are preferably performed with a time-out signal of a timer which starts at an arbitrary time during molding.

Still furthermore, the correction program is preferably provided with a function of selecting an item required to be corrected from the initially set molding condition values based on the present correction direction and quantity corresponding to an quality defect item and a quality defect degree which are obtained from operator's visual quality determination results; a function of correcting the set value of the selected set item; and a function of issuing an operation command for changing supplementary molding conditions constituted of a mold temperature, a core-material resin temperature, and the like, when the corrected set value reaches a preset critical correction value.

In the present invention, the mold with an insulating cavity layer formed on the mold cavity surface opposed to the resin decorating layer of the skin material may be used.

The present invention also provides a resin multilayer molding device in which a skin material having a resin decorating layer on a surface and a core-material resin are integrally molded in a mold, comprising:

carrying means for carrying and setting the skin material to a predetermined position of a mold cavity and carrying a molded product to a predetermined position after molding, and supply means for supplying a molten resin forming a core material into a mold cavity space; and a clamping condition setting section for setting/entering a clamping condition and a thickness of an air insulating layer during supply and after supply of the molten resin, a change-over timing setting section for a change-over timing condition for forming the air insulating layer and a change-over timing condition for eliminating the air insulating layer, a temperature detecting section for detecting a temperature of the core-material resin and a temperature of the resin decorating layer of the skin material during molding, a comparison control section for comparing/determining a detection signal of the temperature detecting section and a set value of the change-over timing setting section, and a clamping control section for controlling clamping means based on a signal of the comparison control section and a set value of the clamping condition setting section.

Furthermore, the present invention provides a resin multilayer molding device in which a skin material having a resin decorating layer on a surface and a core-material resin are integrally molded in a mold, comprising:

carrying means for carrying/setting the skin material to a predetermined position of a mold cavity and carrying a molded product to a predetermined position after molding, and supply means for supplying a molten resin forming a core material into a mold cavity space; and a clamping condition setting section for setting/entering a clamping condition and a thickness of an air insulating layer during supply and after supply of the molten resin, a heating temperature condition setting section for setting a temperature to which the resin decorating layer of the skin material is heated, a heating temperature detecting section for detecting the heating temperature of the resin decorating layer of the skin material, heating means for heating the resin decorating layer of the skin material based on a set value of the heating temperature condition setting section and a detection signal of the heating temperature detecting section, and a clamping control section for controlling clamping means based on a set value of the clamping condition setting section.

The above-mentioned multilayer molding device is preferably when an injection molding device is employed.

The multilayer molding device equipped with the injection molding device preferably includes an initial setting input section for initially setting/entering as molding condition values an injection filling condition for injection filling the molten resin forming the core material into the mold cavity space and refilling a cooling/solidification shrinkage quantity, a clamping condition during the injection filling, a thickness of the air insulating layer, a change-over timing condition for forming the air insulating layer and a change-over timing condition for eliminating the air insulating layer; a molding device control section for operating/controlling the multilayer molding device for performing resin multilayer molding based on set values of the initial setting input section; a quality determination input section for entering visual quality determination results; and a correction program storage section for storing a correction program for correcting the initially set molding condition values based on input values of the quality determination input section to set optimum molding conditions for preventing the resin decorating layer of the skin material being molded from being damaged.

Moreover, the multilayer molding device preferably includes an initial setting input section for initially setting/entering as molding condition values an injection filling condition for injection filling the molten resin forming the core material into the mold cavity space and refilling a cooling/setting shrinkage quantity, a clamping condition during the injection filling, a thickness of the air insulating layer, a change-over timing condition for forming the air insulating layer, a change-over timing condition for eliminating the air insulating layer, and a heating condition for heating the resin decorating layer of the skin material using heating means; a molding device control section for operating/controlling the multilayer molding device for performing resin multilayer molding based on set values of the initial setting input section; a quality determination input section for entering visual quality determination results; and a correction program storage section for storing a correction program for correcting the initially set molding condition values based on input values of the quality determination input section to set optimum molding conditions for preventing the resin decorating layer of the skin material being molded from being damaged.

Furthermore, the multilayer molding device preferably includes a timer which starts at an arbitrary time during molding, and a change-over timing setting section for setting the change-over timing condition for forming the air insulating layer and the change-over timing condition for eliminating the air insulating layer in response to a time-out signal of the timer, and means for forming the air insulating layer may be incorporated in the mold. Additionally, an insulating cavity layer may be formed on a cavity surface opposed to the resin decorating layer of the skin material.

Furthermore, in case of the present inventive, device a conventional known method can be applied as the molding method, and injection molding, press molding, blow molding, vacuum molding and other various molding methods can be used. Among the methods, the injection molding and the press molding are preferable.

BRIEF DESCRIPTION OF THE DRAWINGS

FIG. 12 is a flowchart for performing molding of a fifth embodiment using the resin molding device shown in FIG. 2.

FIG. 13 is a flowchart for performing molding of a sixth embodiment using a resin molding device shown in FIG. 2.

DESCRIPTION OF THE PREFERRED EMBODIMENTS

Figure 1:
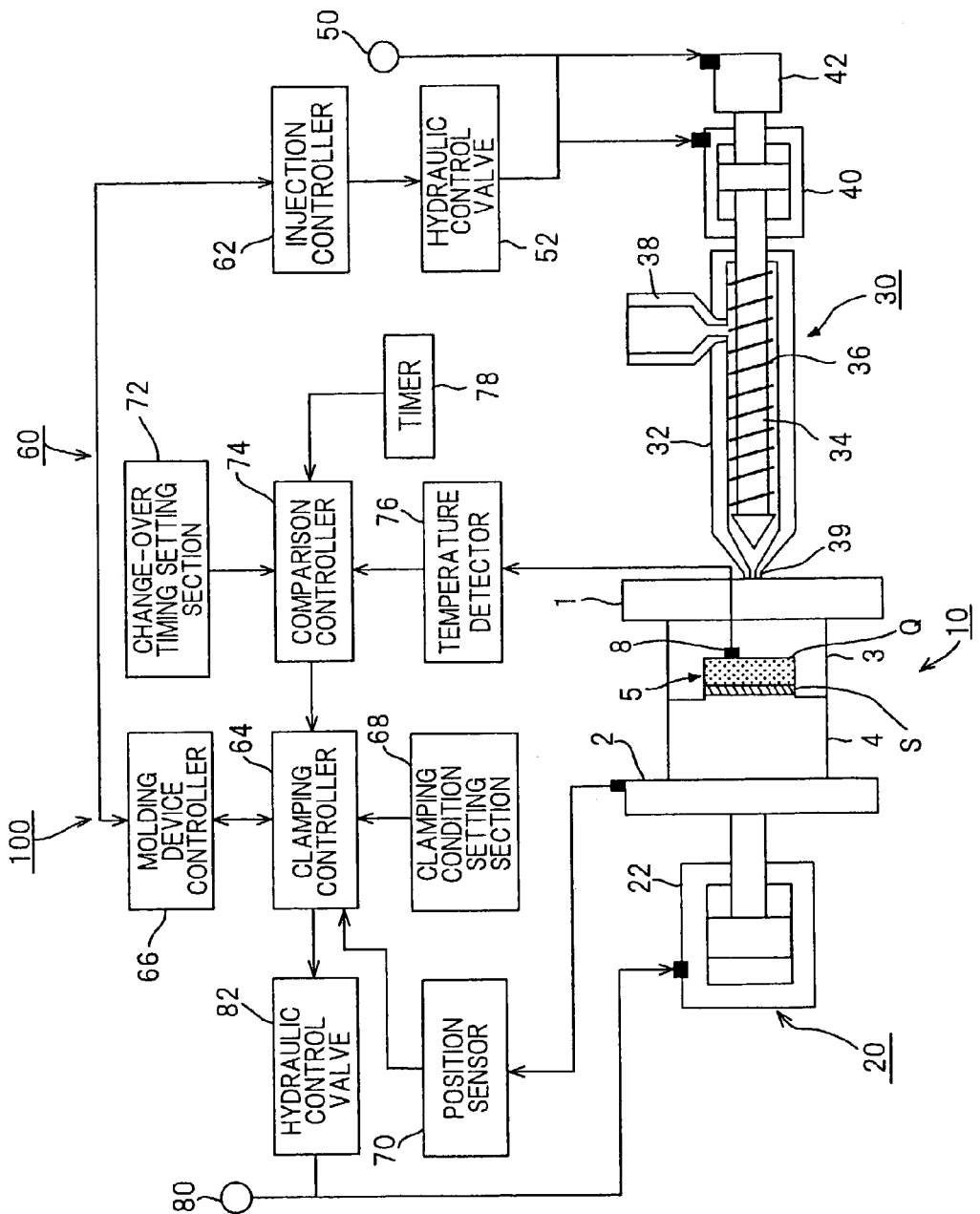
FIG. 1 is a block diagram of the entire constitution of a direct pressure clamping system injection molding machine.

The present invention will be described in detail.

For convenience of description, the invention will be described based on a case where injection molding is used as a molding method.

When the injection filling of a molten resin forming a core material is started, a resin decorating layer of a skin material is simultaneously heated by the heat quantity of the core-material molten resin. Here, since the glass transition point Tgs of the resin decorating layer of the skin material and the supply temperature Tc of the core-material molten resin are preset so as to have a relationship of Tgs<Tc, the resin decorating layer is continued to heat until the maximum temperature Tsm of the resin decorating layer of the skin material during clamping satisfies Tsm>Tgs. Subsequently, after the integration of the skin material and the core-material resin and the claming of the core-material resin are substantially completed, a gap is formed between the resin decorating layer of the skin material and a mold cavity surface opposed to the resin decorating layer to form an air insulating layer at a preset arbitrary time estimated on the basis of a correlation between a temperature of the core material resin and a temperature of the skin material within a temperature range in which the temperature Tsc of the resin decorating layer to which a temperature of the skin material rises again after the air insulating layer is formed satisfies Tsc≧Tgs, and this state is retained for a predetermined time.

As aforementioned, in the temperature condition which satisfies Tcc≧Tgs, the resin decorating layer of the skin material is in a temperature region in which it exhibits rubber-like elasticity, and the resin decorating layer of the skin material damaged by external forces (influences of heat and pressure) during molding can restore itself by an elastic force. Furthermore, by making a gap between the resin decorating layer of the skin material and the mold cavity face opposed to the resin decorating layer, the restoration space of the resin decorating layer of the skin material is given. Additionally, since the air insulating layer is formed, the synergistic effect of enlargement of the temperature region in which the rubber-like elasticity is exhibited allows the resin decorating layer of the skin material to restore itself, so that a resin multilayer molded product without being damaged even after molding can be obtained. As a result, contradictory molding controls for the clamping of the core-material resin and the damage prevention of the decorating skin material can be simultaneously achieved in a series of molding processes, and the stable supply of high-quality resin multilayer molded products can be realized without deteriorating target surface decorating performance.

Further, in the case where at the preset arbitrary time estimated on the basis of a correlation between a temperature of the core material resin and a temperature of a skin material within the temperature range in which the temperature Tcc of the core-material resin during clamping satisfies Tsc≧Tgs due to a secondary rise of temperature of the skin layer after an air insulating layer is formed, the resin deccorating layer of the skin material is heated up again to a temperature of Tgs or more at which a rubber-like elasticity shows due to heat quantity of the core-material resin even if a temperature of the resin decorating layer of the skin material is cooled down to a temperature lower than Tgs. Thus, the resin decorating layer of the skin material achieves the self-restoration, and the core-material resin is cooled sufficiently. As a result, the moldability of the core-material resin is also improved.

Furthermore, in the case where at the preset arbitrary time estimated on the basis of a correlation between a temperature of the core material resin and a temperature of a skin material within the temperature range in which the temperature Tcc of the core-material resin during clamping satisfies Tsc≧Tgs due to a secondary rise of temperature of the skin layer after an air insulating layer is formed, the gap is made between the resin decorating layer of the skin material and the mold cavity face opposed to the resin decorating layer to form and retain for the predetermined time the air insulating layer, since the self restoring capability of the skin-material resin decorating layer can further be enhanced, remarkably high-quality resin multilayer molded products can be obtained without deteriorating the original decorating performance of the skin-material resin decorating layer.

Moreover, in a case where after the air insulating layer is formed, the mold is again closed at the preset time within the temperature range in which the temperature Tsc of the skin-material resin decorating layer satisfies Tsc≧Tgs, after the reprinting of the mold cavity surface in a temperature state of Tgs or more in which the resin decorating layer of the skin material exhibits rubber-like elasticity, cooled with the reprintability being held. In this case, for example, in the combination of the skin material having the resin decorating layer of a printed or painted resin film and the mold having its cavity surface mirror-finished, scratches generated in the manufacture process of the skin material or surface defects such as strains generated in the deformation process during molding, and the like can be completely eliminated, so that a resin multilayer molded product having high surface gloss without any tarnish can be obtained. Moreover, for example, in the combination with the mold having its cavity surface embossed, the embossed pattern on the cavity surface can be exactly reprinted to the resin decorating layer of the skin material. Therefore, a resin multilayer molded product which is embossed uniformly over its entire surface and has no change of the embossed pattern even on its corner portion can be obtained, as compared with a molded product obtained in the multilayer molding method using the skin material to which the embossed pattern is applied beforehand.

Additionally, in a case where the resin decorating layer of the skin material is forced to be heated to the glass transition point Tgs or a higher temperature using the heating means while the air insulating layer is formed, after the integration of the skin material and the core-material resin and the clamping of the core-material resin are completely finished, the heating process and the formation of the air insulating layer can be performed. Therefore, the clamping ability of the core-material resin can further be enhanced, and the complete self restoration of damages on the resin decorating layer of the skin material can be attained. Furthermore in this case, even in the molding conditions in which the temperature condition under which a temperature Tsc of the resin decorating layer with a temperature of the skin material rising again after the air insulating layer is formed satisfies $Tsc \geq Tsm$ and $Tsc \geq Tgs$ cannot be set due to a lower temperature of the core-material resin during clamping, a high-quality resin multilayer molded product can be obtained without deteriorating the target surface decorating performance.

Furthermore, in the case that the resin decorating layer of the skin material is heated by a heating means after the air insulating layer is formed, the resin decorating layer can be heated up to Tgs, a thermal deformation temperature, or the melting point or higher. Therefore, in the case that the mold is again closed at the preset time within such a temperature, a resin multilayer molded product having high surface gloss without any tarnish or a resin multilayer molded product having its entire surface uniformly embossed can be obtained.

Moreover, in the resin multilayer molding method described above, by also using a mold which has an insulating cavity surface on its mold cavity surface opposed to the resin decorating layer of the skin material, the effect of enlargement of the temperature region in which the resin decorating layer of the skin material exhibits rubber-like elasticity at the time of formation of the air insulating layer (i.e., the enlargement of time allowance for restoration) can further be promoted. Especially, in the molding method in which the mold is closed again after the air insulating layer is formed, since the drop in the temperature of the skin-material resin decorating layer by the insulating cavity face can be prevented, the quality of a molded product can be remarkably and effectively enhanced.

Furthermore, in the resin multilayer molding method described above, by initially setting the substantial molding conditions necessary for the molding and by entering the quality determination result after the trial molding, the set value to be corrected can be selected from preset initial set values in accordance with the entered quality determination result, and the correction quantity and direction can be automatically corrected by the correction program in such a manner that a good-quality molded product can be obtained. Therefore, even an insufficiently skilled operator can easily set the optimum molding conditions, there is no fluctuation in quality of the molded product by operator's skill difference, and the enhancement of productivity or other effects can be obtained by automating the optimum molding condition setting and reducing the conditioning time. As a result, remarkably high-quality resin multilayer molded products can be stably supplied without deteriorating the target surface decorating performance, and cost can be reduced by the enhancement of productivity.

Still furthermore, in addition to the resin multilayer molding method described above, the present invention provides a resin multilayer molding device which can realize the above molding method. Therefore, for any skin material in which a resin decorating layer formed by laminating a resin decorating layer portion constituted of a resin film, a woven fabric, a nonwoven fabric made of polymer fiber singly or in a combined manner and an intermediate decorating layer portion constituted of a foaming resin on a back surface of the surface decorating layer portion as needed in accordance with a surface decorating purpose, and a base layer constituted of a resin film, a woven fabric or a nonwoven fabric or a combination thereof as needed are laminated, contradictory molding controls for molding the core-material resin and for preventing the decorating skin material from being damaged can be achieved simultaneously in a series of molding processes. The stable supply of remarkably high-quality resin multilayer molded products can be realized without deteriorating the target surface decorating performance.

The present invention will be described in detail based on embodiments shown in the accompanying drawings.

FIG. 1 is a block diagram showing the entire of a direct pressure clamping type injection molding device and, as shown in FIG. 1, a resin multilayer molding device 100 of the present invention uses a general-purpose injection molding machine and is constituted of a mold device 10, a clamping device 20, an injection device 30 and a control device 60. The mold device 10 is constituted of a stationary side mold 3 attached to a stationary platen 1 and a moving side mold 4 attached to a moving platen 2, and the moving platen 2 and the moving side mold 4 can be advanced or retreated by a clamping cylinder 22 of the clamping device 20.

The clamping device 20 is provided with the clamping cylinder 22 for opening or closing the molds 3 and 4 of the mold device 10, and the movable mold 4 can be guided by a tie bar (not shown) to advance or retreat relative to the fixed mold 3.

In the injection device 30, a screw 34 provided with a spirally attached screw flight 36 can rotate and advance or retreat freely in a barrel 32. When the screw 34 is operated by a hydraulic motor 42 to rotate, resin pellets supplied to a hopper 38 are fed to the front of the screw 34. During this operation, the resin pellets are heated by a heater (not shown) attached to an outer peripheral face of the barrel 32, and molten under kneading action of the rotating screw. The molten resin fed to the front of the screw 34 is pushed out toward through a nozzle 39 by the screw 34 operated by an injection cylinder 40 to advance, and injected into a mold cavity 5 formed between the molds 3 and 4 via the nozzle 39.

The control device 60 will next be described. As diagrammatically shown in FIG. 1, the control device 60 is constituted of an injection controller 62, a clamping controller 64, a molding device controller 66, a clamping condition setting section 68, a position sensor 70, a change-over timing setting section 72, a comparison controller 74, a temperature detector 76 and a timer 78.

The injection cylinder 40 and the forward/reverse hydraulic motor 42 are controlled by a hydraulic control valve 52 receiving an operation command from the injection controller 62 to advance and rotate the screw. The molding device controller 66 connected to the injection controller 62 is also connected to the clamping controller 64.

Temperature information of a core-material resin Q measured by a temperature sensor 8 is connected to the comparison controller 74 via the temperature detector 76. Furthermore, the comparison controller 74 is connected to the clamping controller 64 and also to the change-over timing setting section 72 and the timer 78.

Additionally, in order to obtain temperature information of a resin decorating layer of a skin material S, the temperature sensor 8 is also attached on the side of the resin decorating layer.

Information measured by the position sensor 70 attached to the movable board 2 is transfered via the clamping controller 64 to give an operation command to the molding device controller 66, and also transfered to the clamping condition setting section 68 through an electrical or mechanical connection. Furthermore, the clamping controller 64 transmits a signal to the clamping cylinder 22 of the clamping device 20 via a hydraulic control valve 82. Additionally, numeral 50 denotes a hydraulic supply on an injection circuit side, and 80 denotes a hydraulic supply on a clamping circuit side.

Moreover, in the embodiment shown in FIG. 1, the injection molding machine including the direct pressure type clamping device is used, but an injection molding machine including a toggle type clamping device, a vertical injection molding machine or an injection molding machine including an electric drive clamping device may be used.

[First Embodiment]

Figure 8:
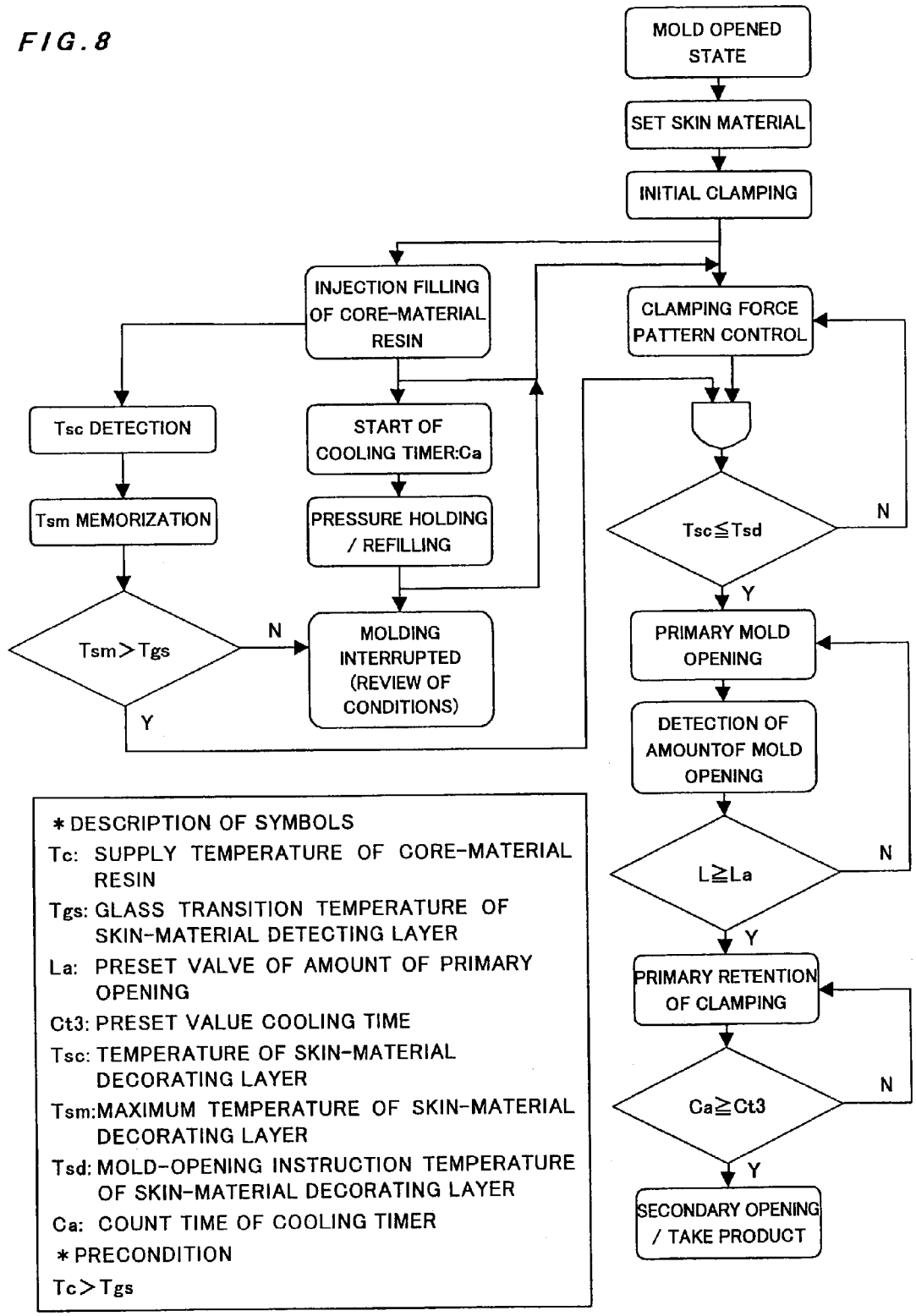
FIG. 8 is a flowchart for performing molding of a first embodiment using a resin molding device shown in FIG. 1.

A molding method of a first embodiment where a change-over timing control is conducted by a temperature of a skin material based on FIG. 8 using the resin multilayer molding device of FIG. 1 will be described.

The combination of a skin material S and a core material Q is preset in such a manner that a glass transition point Tgs of a resin decorating layer of a skin material S and a supply temperature Tc of a molten resin to be as the core material Q have a relationship of Tgs<Tc.

The skin material S satisfies the target surface decorating performance, and is constituted by laminating a resin decorating layer which is formed by laminating a resin decorating layer portion constituted of a resin film, a woven fabric, a nonwoven fabric made of polymer fiber singly or in a combined manner and an intermediate decorating layer portion constituted of a foaming resin on a back surface of the surface decorating layer portion as needed in accordance with a surface decorating purpose, and a base layer constituted of a resin film, a woven fabric or a nonwoven fabric or a combination thereof as needed.

For the core-material resin Q, a resin material is selected to satisfy mechanical and chemical properties required for a molded product. For example, when a polypropylene (PP) resin is used as the core-material resin Q, and the skin material S is decorated using a polyethylene terephthalate (PET) resin as the resin decorating layer, the supply temperature Tc of PP resin in usual molding is about 200 to 230° C., while Tg of PET resin is about 70° C. Therefore, Tgs<Tc is sufficiently satisfied.

Since a timing for forming an air insulating layer is controlled by a temperature of the core material resin, data regarding a correlation between a temperature of the core-material resin during clamping and forming and retaining the air insulating layer and a temperature of the skin material decorating layer are experimentally gathered under the aforementioned molding conditions.

The skin material S is set in a predetermined position inside the metal-mold cavity 5 using a carrying device section as carrying means (not shown) and using, for example, pin sticking, spring pressing, vacuum suction, or another means. The supplied skin material S may have any a configuration selected from a sheet configuration cut to a product outline, a rolled configuration to be fed as it is, and a configuration preliminarily molded in accordance with a product configuration. After setting the skin material S, the hydraulic control valve 82 is controlled by the clamping controller 64 based on the initial clamping condition set/ entered beforehand in the clamping condition setting section 68 to perform initial clamping. For the initial clamped state, for example, in a case of the skin material S including the resin decorating layer formed by the surface decorating layer portion constituted of a resin film, a woven fabric, a nonwoven fabric made of polymer fiber singly or in a combined manner, the molds 3 and 4 are in a completely clamped state in which the molds are loaded with a complete closing/ clamping force, or in a low-pressure clamped state in which the molds are loaded with a relatively small clamping force and allowed to open slightly by the pressure of the core-material resin Q when the molds are filled with the injected core-material resin Q.

Moreover, for example, in a case of the skin material S which is constituted by laminating the intermediate decorating layer portion constituted of a foaming resin on the back surface of the surface decorating layer portion, at the time of injection filling of the core-material resin Q, the injected molten resin is prevented from abutting directly on the foaming resin or melting/losing the foaming resin. To this end the molds are placed in an initial clamped state in which the molds are kept open to have a gap to a degree to which the injected molten resin fails to abut directly on the foaming resin.

Additionally, the initial clamped state is selected from the open mold retaining state, the completely clamped state and the low-pressure clamped state in accordance with a type of gate (direct gate or side gate) in mold.

In the initial clamped state, the molten resin forming the core-material resin Q is injected/filled into a space formed by the skin material S and the metal-mold cavity 5. Subsequently, for the purpose of compensating for a cooling/ solidification shrinkage of molten resin, pressure holding or refilling of the core-material resin Q is continued as required. Additionally, during the injection filling process or the pressure holding/refilling process of the core-material resin Q, the initial clamped state may be continued. If necessary, the clamping force or the open mold retention quantity may be controlled in multiple stages based on the clamping multi-pattern control condition preset by the clamping condition setting section 68. Alternatively, by injecting/filling the quantity of resin with the cooling/solidification shrinkage quantity of the resin added thereto in the injection filling process, pressure holding may be performed on the clamping side by the clamping multi-stage control.

Simultaneously with the injection filling and the pressure holding/refilling of the core-material resin Q, the temperature Tcc of the core-material resin Q and the temperature Tsc of the resin decorating layer of the skin material S are detected by the temperature detector 76. The resin decorating layer of the skin material S is heated by the heat quantity of the core-material resin Q. Here, in the temperature condition in which the maximum temperature Tsm of the resin decorating layer of the skin material S being molded is equal to or lower than the glass transition point Tgs (Tsm≦Tgs), the damaged resin decorating layer being molded cannot be restored by virtue self restoring capability based on rubber-like elasticity described later. In such a case, there is required a readjustment of the molding conditions such as, for example, further raise of a temperature of the core-material resin Q to be supplied, a raise of mold temperature, replacement of the material of a resin decorating layer of the skin material S, or the like. Therefore, the molding condition of Tsm>Tgs is prerequisite.

Additionally, if the molding condition of Tsm>Tgs is confirmed beforehand, the above-mentioned procedure becomes unnecessary.

The integration of the skin material S and the core-material resin Q and the cooling/solidification of the core-material resin Q are performed in a cooling retention process, and the comparison controller 74 detects that a temperature (Tsc) of the resin decorating layer of the skin material detected by the temperature detector 76 coincides with a previously estimated and set temperature (Tsd) of the skin material so that a temperature Tsc, which temperature of the resin decorating layer reaches by rising again after an air insulating layer is formed, satisfies Tsc≧Tgs. Subsequently, the clamping controller 64 operates the hydraulic control valve 82 to perform a mold opening operation in such a manner that a gap is formed between the resin decorating layer of the skin material S and the mold cavity surface opposed to the resin decorating layer.

Figure 16:
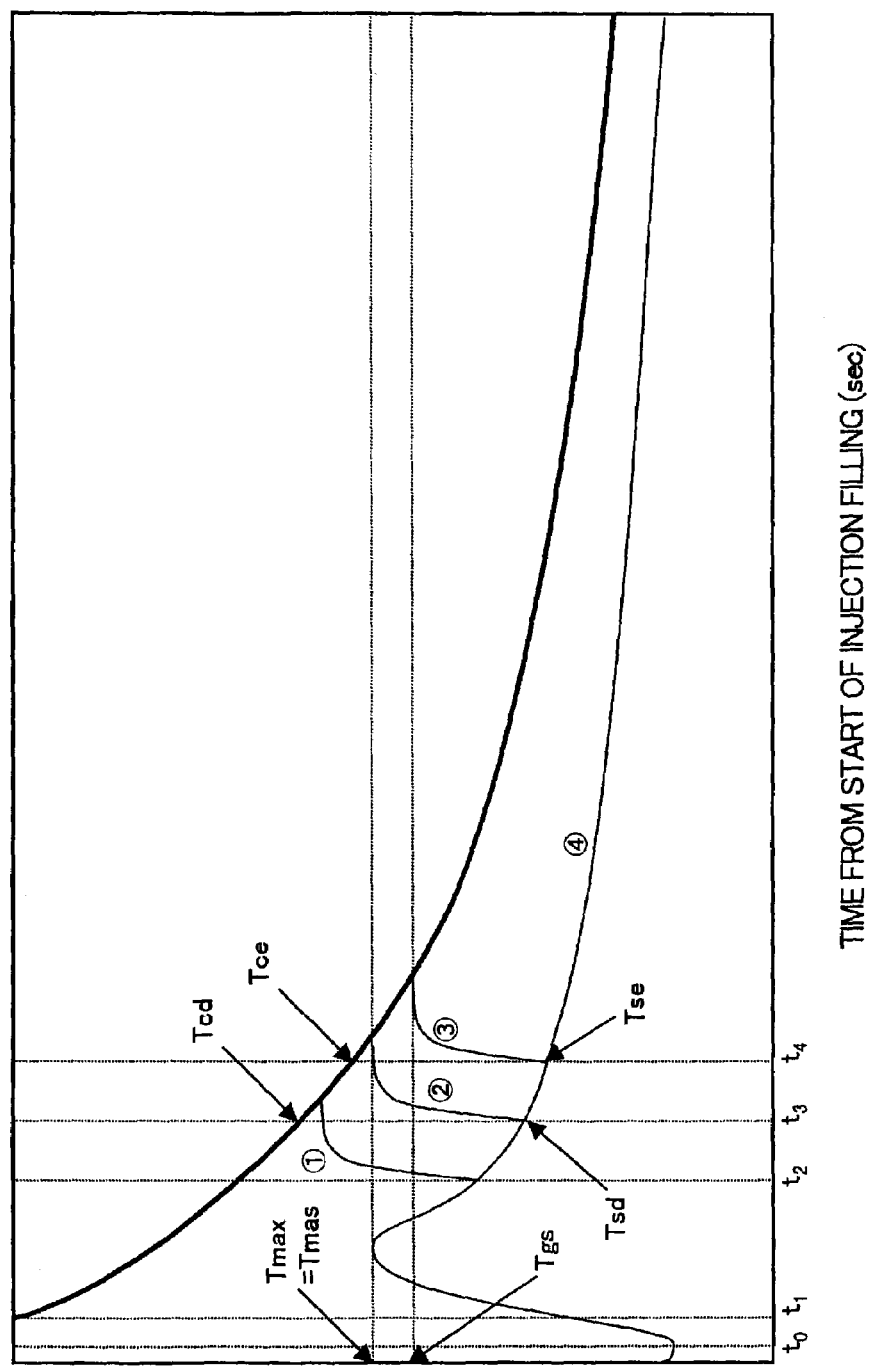
FIG. 16 is a graph showing a correlation between a temperature of the core-material resin during clamping and forming and retaining the air insulating layer and a temperature of the skin material decorating layer.

Here, a correlation between core material resin temperature and skin material temperature is described in detail on the basis of FIG. 16. FIG. 16 is a graph showing temperature transition of a core material resin and a skin material. The temperature curve ④ in FIG. 16 shows a conventional temperature transition, and the temperature curves ① ② ③ show temperature transitions of the present invention. That is, time in the case of conventional one, a temperature of the skin material S gradually ascends due to a heat quantity of the core material resin Q from the normal temperature and reaches the maximum temperature Tmax (corresponding to Tsm) at an intermediate time between the time t1 and the time t2 in a short time while a temperature of the core material resin Q monotonously descends with the lapse of time when the injection of the core material resin Q into a mold cavity starts after the mold where the skin material S is sandwiched is closed. Subsequently, a temperature of the skin material S descends according to the descent of a temperature of the core material resin Q to approach a temperature of a core material Q. However, the temperature is lower than the temperature of the core material resin Q. This is the state of the conventional temperature transition.

On the other hand, in the present invention, release of heat which the core material resin Q has outside along the mold is intercepted, and heat is steadily given to the skin material S from the core material resin Q, and the temperature of the skin material ascends unitl it becoms equal to a temperature of a core resin Q as the curve ① if the mold is opened just after the time t2 after a temperature of the skin material S reaches the maximum temperature Tmax as shown in FIG. 16. Likewise, when the mold is opened at the time t3, the temperature of the skin material S rises as the curve ②, and when the mold is opened at the time t4, the temperature of the skin material S rises as the curve ③. The curve ④ in the case of not opening the mold during molding is the same as FIG. 16.

As is apparent from the comparison among the temperature curves ①, ②, and ③, the earlier the mold is opened, the higher the temperature rising again ascends, and the later the mold is opened, the lower the temperature rising again ascends. That is, the destination temperature is the maximum temperature Tmax or higher in the temperature curve ①, the destination temperature is equal to the maximum temperature (Tmax) in the temperature curve ②, and the destination temperature is lower than the maximum temperature Tmax in the temperature curve ③.

Thus, the aforementioned-change-over timing control is made possible by inputting a temperature of the skin material (temperature in the state of descending after passing Tsm) which is expected to rise again after the air insulating layer is formed and reach the temperature Tgs or higher in the change-over timing setting section 72.

Thus, a temperature of the skin material can be controlled within the range satisfying Tsc≧Tgs. In this range of temperature, the resin decorating layer of the skin material S is in a temperature region in which the rubber-like elasticity is shown. Therefore, the resin decorating layer of the skin material S damaged by external forces (heat and pressure influences) during molding can restore itself by the elastic force. Furthermore, through the mold opening operation, the resin decorating layer of the skin material S is given a restoration space. Additionally, the formation of the air insulating layer produces the synergistic effect of enlargement of the temperature region in which the rubber-like elasticity is shown, and the resin decorating layer of the skin material S restores itself.

Therefore, the minimum thickness Lm of the resin decorating layer of the skin material S being during clamping, the thickness Lf of the resin decorating layer which satisfies the target surface decorating performance after molding and the thickness La of the air insulating layer have a relationship Lf−Lm≦La.

The formed air insulating layer is retained until a cooling time Ct3 preset by the clamping condition setting section 68 is elapsed. Specifically, when the state in which the resin decorating layer of the skin material S damaged during molding restores itself is retained until the resin decorating layer reaches Tgs or a lower temperature, through the molecular motion of the polymer in the resin decorating layer, skin material S is restored to a stable molecular state before molding in which its original decorating performance is provided. Since the subsequent cooling retention stops the molecular motion, the restored state can be maintained. After an elapse of the cooling time Ct, the mold opening operation is performed to take out a molded product using the carrying device section (not shown). By performing the resin multilayer molding method described above, the contradictory molding controls for the molding of the core-material resin Q and the prevention of the decorating skin material from being damaged can be simultaneously achieved in a series of molding processes, and the stable supply of high-quality resin multilayer molded products can be realized without deteriorating the target surface decorating performance.

[Second Embodiment]

Figure 9:
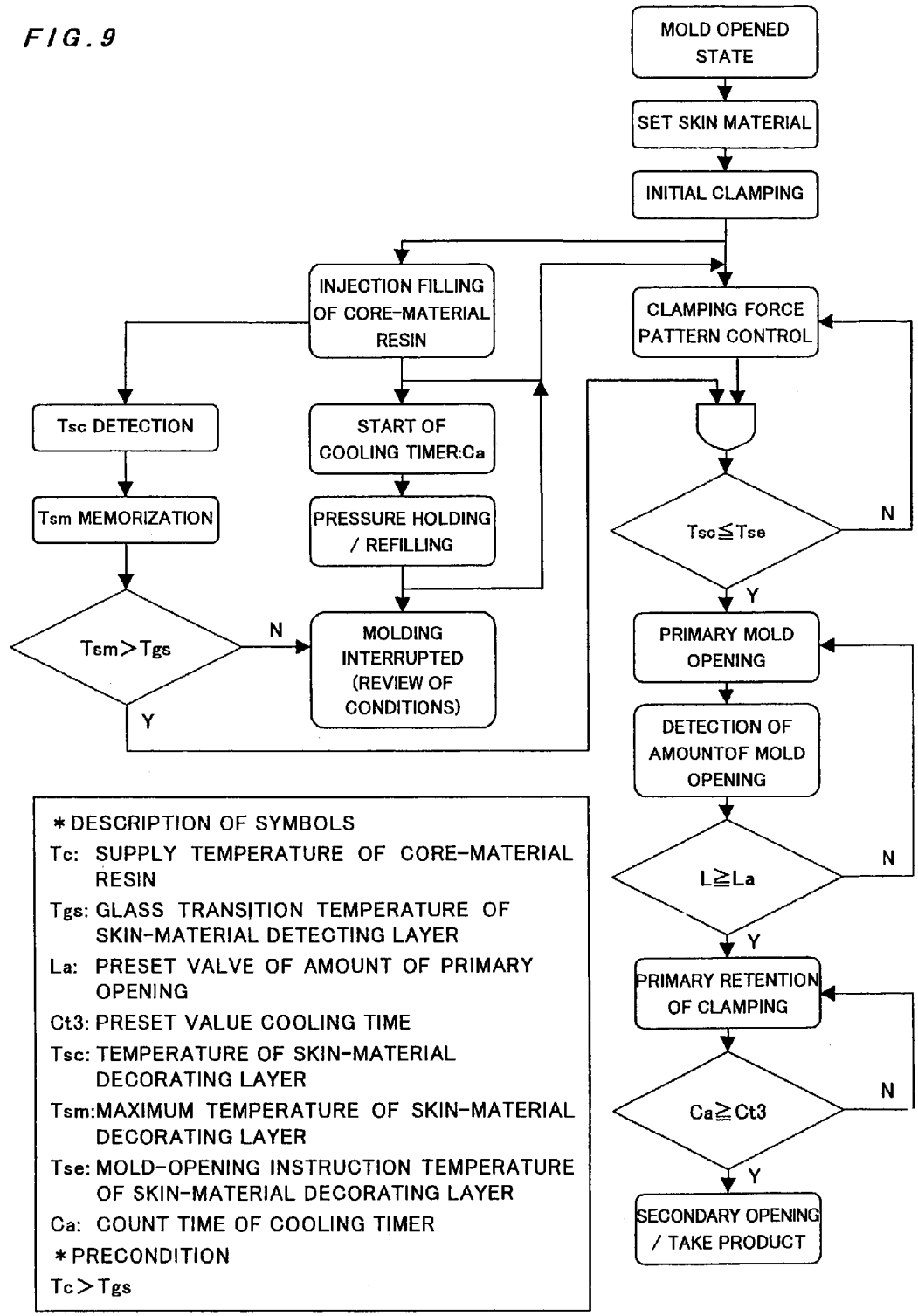
FIG. 9 is flowchart for performing molding of a second embodiment using the resin molding device shown in FIG. 1.

In the same manner as in the first embodiment, a molding method of a second embodiment where a change-over timing control is performed by a temperature of a skin material based on FIG. 9 using the resin multilayer molding device shown in FIG. 1 will be described.

The resin multilayer molding device, the combination of the skin material S and the core-material resin Q, the type of the skin material S, and the method of setting the skin material S are the same as those in the first embodiment. After the skin material S is set in the mold opened state and the initial clamping is performed, the injection filling and the pressure holding/refilling of the core-material resin Q are performed. The initial clamped state, the clamping multi-stage control, and the temperature condition relationship (Tsm>Tgs) during molding are also the same as those in the first embodiment. The integration of the skin material S and the core-material resin Q and the cooling/setting of the core-material resin Q are performed in the cooling retention process, and the comparison controller 74 detects that a temperature (Tsc) of the resin decorating layer of the skin material detected by the temperature detector 76 coincides with a temperature (Tse) of the skin material expected to satisfy Tsc≧Tgs, and Tsc≧Tsm by rising again after the air insulating layer is formed, the temperature (Tsc) being input in the change-over timing setting section 72 in the same manner as in Example 1. Subsequently, the clamping controller 64 operates the hydraulic control valve 82 to perform a mold opening operation in such a manner that a gap is formed between the resin decorating layer of the skin material S and the opposed mold cavity surface, and the air insulating layer which satisfies the condition of Lf−Lm≦La is formed. Additionally, the definition and effect of the thickness La of the air insulating layer are the same as those in the first embodiment.

The formed air insulating layer is retained until the cooling time Ct preset by the clamping condition setting section 68 is elapsed. Subsequently, by performing the mold opening operation, a molded product is taken out.

In the method, for example, in a case where the resin decorating layer of the skin material S is constituted of a crystalline resin, the resin decorating layer is heated by the heat quantity of the core-material resin Q to Tgs or a higher and Tsm or higher temperature during molding, low-melting micro crystals in the resin composition are fused, and the fusion quantity reaches its maximum at the temperature of Tsm. In the conventional molding method, since the fused micro crystals are recrystallized during cooling and act as a pseudo-crosslinking point to restrain the molecular motion, the damage suffered during molding is left as it is (frozen as a permanent strain). In the molding method of the embodiment, since the resin decorating layer after the air insulating layer is formed is reheated up to Tsm or higher, micro crystals which has restrained the molecular motion by recrystallization are eliminated, thereby the resin decorating layer is recovered in the state before molding due to elasticity of resin (the strain caused by the deformation during molding is released). By cooling down to Tgs or a lower temperature in this state, the molecular motion of the resin brings back the stable molecular state before molding in which the skin material has its original decorating performance. By the cooling in the state, the molecular motion is stopped, and the damage of the resin decorating layer can be completely eliminated.

[Third Embodiment]

Figure 10:
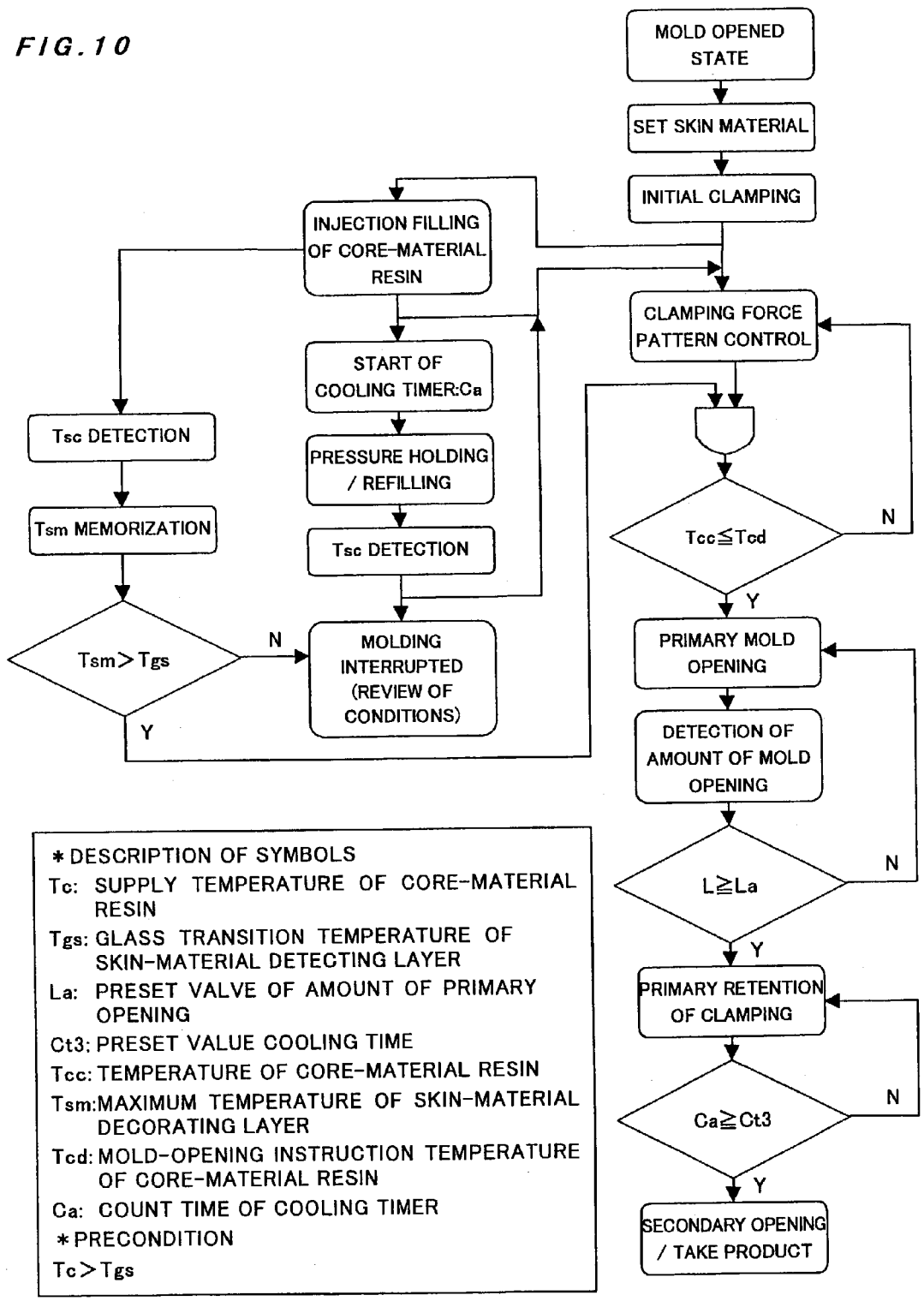
FIG. 10 is a flowchart for performing molding of a third embodiment using the resin molding device shown in FIG. 1.

In the same manner as in the first embodiment, a molding method of a third embodiment where a change-over timing control is performed by a temperature of a core material resin based on FIG. 10 using the resin multilayer molding device shown in FIG. 1 will be described.

Since a timing for forming the air insulating layer is controlled by a temperature of the core material resin, data regarding a correlation between a temperature of the core-material resin during clamping and forming and retaining the air insulating layer and a temperature of the skin material decorating layer are experimentally gathered under the aforementioned molding conditions.

The resin multilayer molding device, the combination of the skin material S and the core-material resin Q, the type of the skin material S, and the method of setting the skin material S are the same as those in the first embodiment. After the skin material S is set in the mold opened state and the initial clamping is performed, the injection filling and the pressure holding/refilling of the core-material resin Q are performed. The initial clamped state, the clamping multi-stage control, and the temperature condition relationship (Tsm>Tgs) during molding are also the same as those in the first embodiment. The integration of the skin material S and the core-material resin Q and the cooling/solidification of the core-material resin Q are performed during the cooling retention process, and then the comparison controller 74 is operated so as to detect that a temperature (Tcc) of the core material resin detected by the temperature detector 76 coincides with an estimated preset temperature (Tcd) of the core material resin Q based on the temperature of the core material resin and the temperature of the skin material so that a temperature (Tsc) of the resin decorating layer satisfy Tsc≧Tgs, and Tsc≧Tsm by rising again after the air insulating layer is formed. Subsequently, the clamping controller 64 operates the hydraulic control valve 82 to perform a mold opening operation in such a manner that a gap is formed between the resin decorating layer of the skin material S and the opposed metal-mold cavity face, and the air insulating layer which satisfies the condition of Lf−Lm≦La is formed. Additionally, the definition and effect of the thickness La of the air insulating layer are the same as those in the first embodiment.

The formed air insulating layer is retained until the cooling time Ct3 preset by the clamping condition setting section 68 is elapsed. Subsequently, by performing the mold opening operation, a molded product is taken.

In the method, for example, in a case where the resin decorating layer of the skin material S is cooled down to Tgs or lower, the resin decorating layer is reheated within a temperature range showing elasticity of Tgs or higher due to the heat quantity of the core-material resin Q, and the damaged resin decorating layer of the skin material S can be self-recovered due to the external force (heat and pressure influence) during molding.

[Fourth Embodiment]

Figure 11:
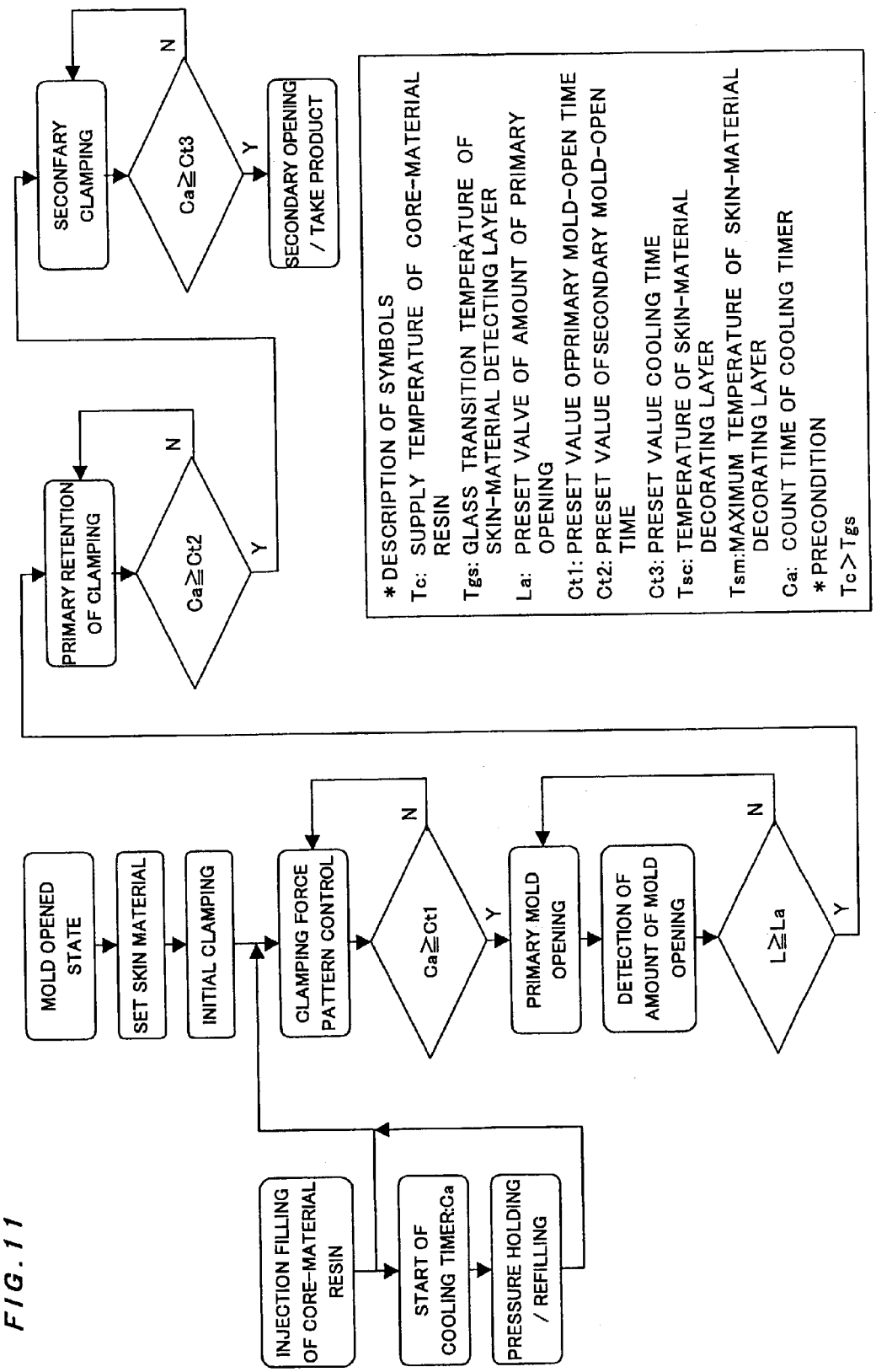
FIG. 11 is a flowchart for performing molding of a fourth embodiment using a resin molding device shown in FIG. 1.

In the same manner as in the first embodiment, a molding method of a fourth embodiment where a change-over timing control is performed by a temperature of a core material resin based on FIG. 11 using the resin multilayer molding device shown in FIG. 1 and an improvement of mold transcription by re-clamping will be described.

In the resin multilayer molding method described in the first, second, and third embodiments, after a temperature Tsc of the resin decorating layer of the skin material S reaches the range satisfying Tsc≧Tgs by forming and retaining the air insulating layer, the mold is closed to eliminate the air insulating layer therein, and the molding process is continued with maintaining pressure.

For example, when the molding method of the first embodiment is used, the air insulating layer is formed based on the first time-out signal (CT1) of a timer which starts after the completion of injection. In the state, on the basis of the second time-out signal (CT2) of a timer preset in a temperature range which satisfies Tsc≧Tsm by the change-over timing setting section 72, the clamping controller 64 operates the hydraulic control valve 82 to perform a clamping operation in such a manner that a gap is eliminated between the resin decorating layer of the skin material S and the opposed metal-mold cavity face. The clamped state is retained until the cooling time Ct3 preset by the clamping condition setting section 68 is elapsed. Subsequently, by performing the mold opening operation, a molded product is taken out. Additionally, in the clamped state, the clamping force may be controlled to change in multiple stages.

In the method, for example, in the combination of the skin material S including the resin decorating layer of a printed or painted resin film and the molds 3 and 4 including a specular-finished mold cavity surface, since the air insulating layer is formed, the resin decorating layer of the skin material S being molded has Tgs or a higher temperature. In the temperature condition, the reprinting of the mold cavity surface is performed. By cooling the resin decorating layer to Tgs or a lower temperature, a good reprinting state is maintained. As a result, scratches made in the manufacture process of the skin material S, strains generated in the deformation process during molding, and other surface defects can be completely eliminated. A resin multilayer molded product having a highly glossy surface without any tarnish can be obtained.

Moreover, for example, in the combination with the molds 3 and 4 including an embossed mold cavity surface, the formation of the air insulating layer and the subsequent clamping process can freeze the exactly face-transferred embossed pattern on the mold cavity surface. Therefore, a resin multilayer molded product can be obtained in which the entire surface is uniformly embossed and even a corner portion has no change in the embossed pattern.

Figure 2:
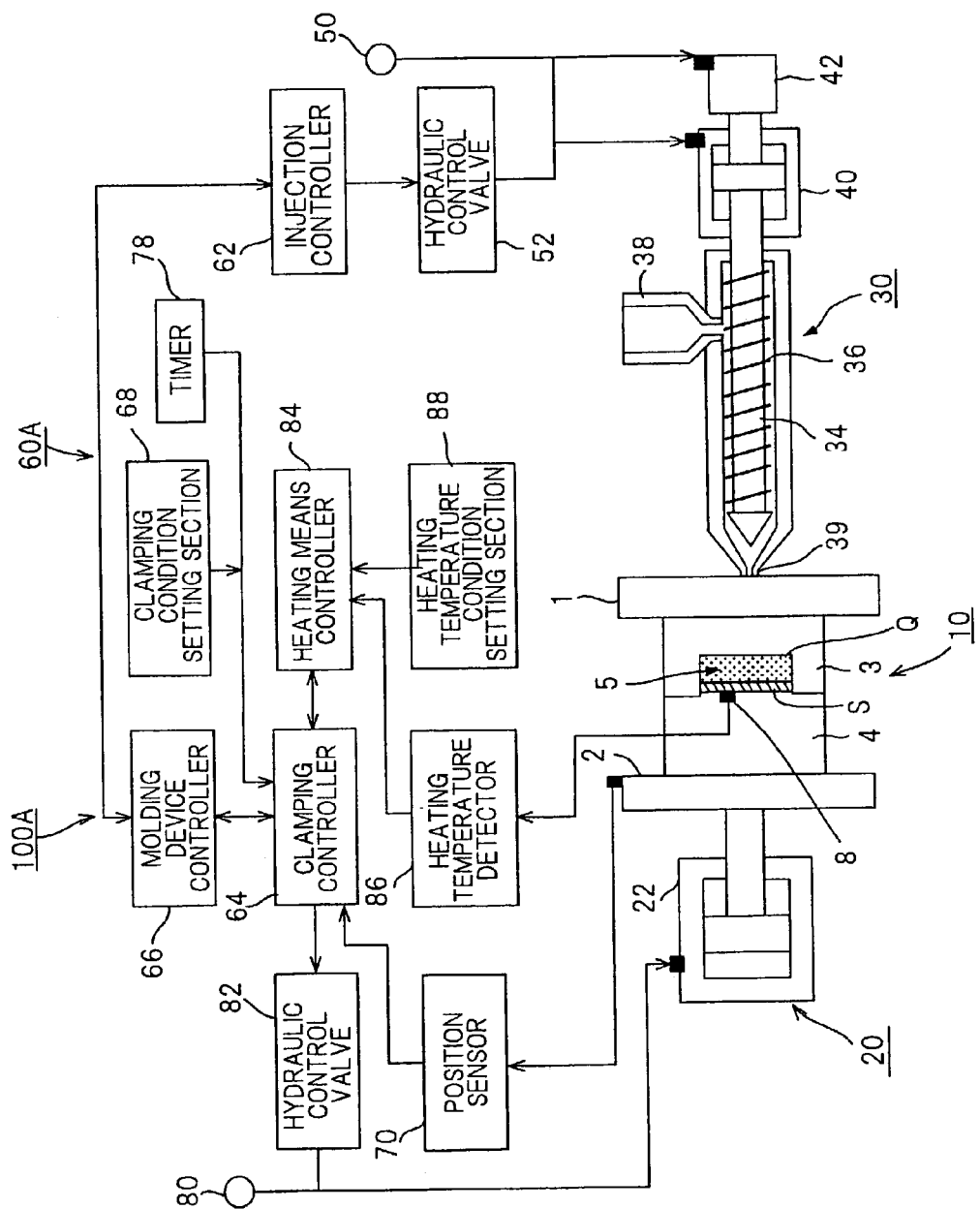
FIG. 2 is a block diagram of the entire constitution of an injection molding machine according to another embodiment of the present invention.

FIG. 2 will next be described.

As shown in FIG. 2, a resin multilayer molding device 100A of the present invention uses a general-purpose injection molding machine, and is constituted of a mold device 10, a clamping device 20, an injection device 30 and a control device 60A. The mold device 10 is constituted of a stationary side mold 3 attached to a stationary platen 1 and a moving side mold 4 attached to a moving platen 2, and the moving platen 2 and the moving side mold 4 can be advanced or retreated by a clamping cylinder 22 of the clamping device 20.

The clamping device 20 is provided with the clamping cylinder 22 for opening or closing the molds 3 and 4 of the mold device 10, and the moving side mold 4 can be guided by a tie bar (not shown) to advance or retreat relative to the stationary side mold 3.

In the injection device 30, a screw 34 provided with a spirally attached screw flight 36 can rotate and advance or retreat freely in a barrel 32. When the screw 34 is operated by a hydraulic motor 42 to rotate, resin pellets supplied to a hopper 38 are fed to the front of the screw 34. During this operation, the resin pellets are heated by a heater (not shown) attached to an outer peripheral face of the barrel 32 while molten under kneading action of the rotating screw. The molten resin fed to the front of the screw 34 is pushed out toward through a nozzle 39 by the screw 34 operated by an injection cylinder 40 to advance, and injected into a mold cavity 5 formed between the molds 3 and 4 via the nozzle 39.

The control device 60A will next be described. As diagrammatically shown in FIG. 2, the control device 60A is constituted of an injection controller 62, a clamping controller 64, a molding device controller 66, a clamping condition setting section 68, a position sensor 70, a timer 78, a heating means controller 84, a heating temperature detector 86 and a heating temperature condition setting section 88.

The injection cylinder 40 and the forward/reverse rotational hydraulic motor 42 are controlled by a hydraulic control valve 52 receiving an operation command from the injection controller 62 to advance and rotate the screw. The molding device controller 66 connected to the injection controller 62 is also connected to the clamping controller 64.

Temperature information of a skin-material decorating layer measured by a temperature sensor 8 is transferred to the heating means controller 84 via the heating temperature detector 86 through an electrical or mechanical connection. The heating means controller 84 is also connected to the heating temperature condition setting section 88.

Information measured by the position sensor 70 attached to the moving platen 2 is transferred via the clamping controller 64 to give an operation command to the molding device controller 66, and also connected to the clamping condition setting section 68 and the timer 78 through an electrical or mechanical connections. Furthermore, the clamping controller 64 transmits a signal to the clamping cylinder 22 of the clamping device 20 via a hydraulic control valve 82. Additionally, numeral 50 denotes a hydraulic supply on an injection circuit side, and 80 denotes a hydraulic supply on a clamping circuit side.

[Fifth Embodiment]

A molding method of a fifth embodiment shown in FIG. 12 using the resin multilayer molding device 100A shown in FIG. 2 will be described.

The combination of the skin material S and the core-material resin Q, the type of the skin material S, the method of setting the skin material S, the initial clamped state and the clamping multi-stage control are the same as those in the first embodiment. After the skin material S is set in the mold opened state, the hydraulic control valve 82 is operated by the clamping controller 64 based on the initial clamping condition preset by the clamping condition setting section 68 to perform initial clamping. Subsequently, the injection filling and the pressure holding/refilling of the core-material resin Q are performed.

Figure 6:
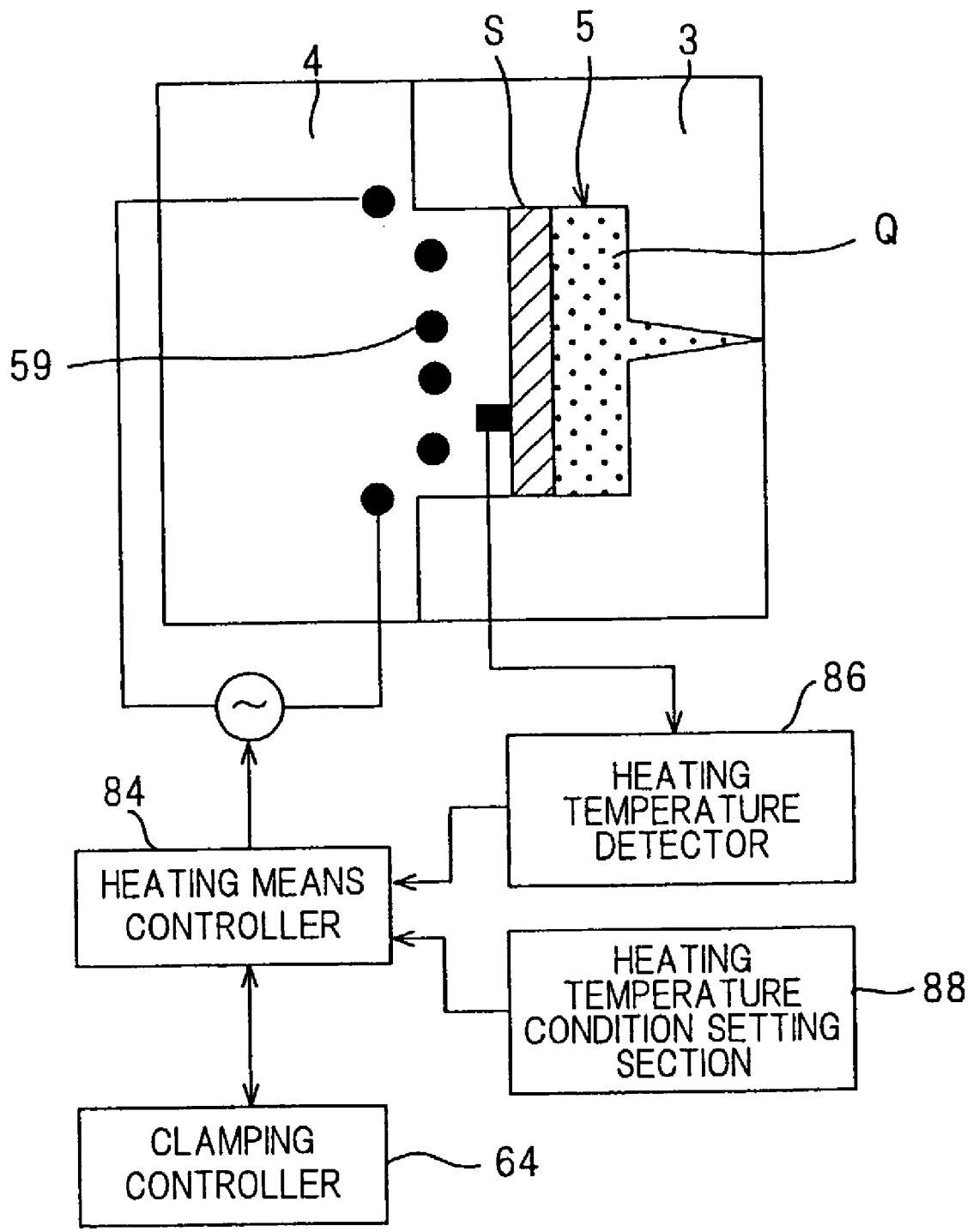
FIG. 6 is an explanatory view showing heating state by heating means which is incorporated inside the mold according to the present invention.

Here, FIGS. 6 and 7 will be described. FIG. 6 shows that the heating means of the resin decorating layer of the skin material S is incorporated in the mold. The mold device including the heating means shown in FIG. 6 is constituted of heating means 59, the clamping controller 64, the heating means controller 84, the heating temperature detector 86 and the heating temperature condition setting section 88.

As shown in FIG. 6, the heating by the heating means incorporated in the mold indicates that the mold cavity face is heated by a conductive heating element which is disposed along a mold cavity configuration inside the closed mold to heat the resin decorating layer of the skin material S. Simultaneously with the heating, the temperature of the resin decorating layer of the skin material S is detected by the temperature sensor 8. At a point when the temperature of the resin decorating layer of the skin material S reaches a preset temperature within a temperature range in which the rubber-like elasticity is shown, the mold is opened and retained only for a set time.

Besides the heating means by the conductive heating element disposed inside the mold, even when, for example, mold heating by circulating heating medium, thin-film heating by coating the mold cavity surface with a conductive heating thin film, mold heating using magnetic, high-frequency or another induction heating, heating by electromagnetic wave or micro wave irradiation, induction heating means by mixing conductive substances in the resin decorating layer and directly heating the resin decorating layer of the skin material S, heating means by jetting hot air or the like to the resin decorating layer of the skin material S, or another heating means is used, the same effect can be obtained.

Figure 7:
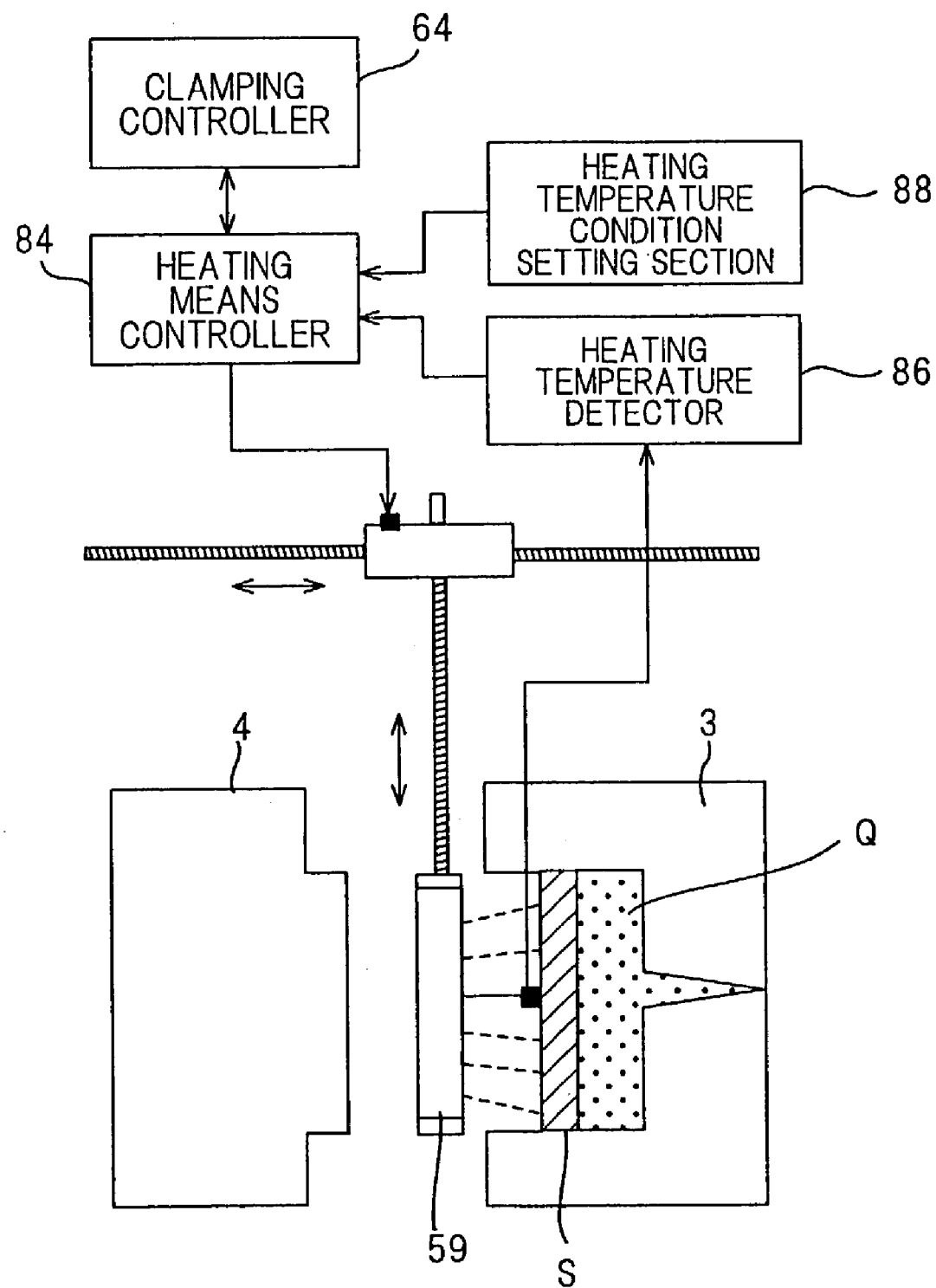
FIG. 7 is an explanatory view showing heating state of heating means outside the mold according to the embodiment of the present invention.

Furthermore, FIG. 7 shows a case where the heating means of the resin decorating layer of the skin material S is incorporated outside the mold.

As shown in FIG. 7, by moving the heating means 59 between the stationary side mold 3 and the moving side mold 4, the resin decorating layer of the skin material S is heated. Simultaneously with the heating, the temperature of the resin decorating layer of the skin material S is detected by a temperature sensor incorporated in the heating means 59. After the temperature of the resin decorating layer of the skin material S reaches a preset temperature within a temperature range in which the rubber-like elasticity is shown, the temperature is retained only for a predetermined time. Additionally, examples of the heating means 59 include a heater, spraying of hot air, irradiation by a halogen lamp, and other direct or indirect heating methods.

Upon receipt of the first time out signal (CT1) of the timer preset by the heating means controller 84 in the cooling retention process so that the integration of the skin material S and the core-material resin Q and the molding of the core-material resin Q can be completely finished, the clamping controller 64 operates the hydraulic control valve 82 to perform mold opening operation in such a manner that a gap is formed between the resin decorating layer of the skin material S and the opposed mold cavity surface. Thus, an air insulating layer which satisfies the condition of $Lf-Lm \leq La$ is formed. The definition and effect of the air insulating layer thickness La are the same as those in the first embodiment. Then, the resin decorating layer of the skin material S is heated using the heating means 59 shown in FIG. 7. The heating still continues even after the heating means controller 84 detects that the signal of the heating temperature detector 86 coincides with the heating temperature condition preset in a temperature range which satisfies $Tsc \geq Tgs$ by the heating temperature condition setting section 88.

Subsequently, upon receipt of cooling time (CT3) preset by the clamping condition setting section 68, mold opening operation is performed to take a molded product out.

In the method, for example, even in the molding conditions which cannot set the temperature condition in which the temperature Tcc of the core-material resin Q being molded and the maximum temperature Tsm of the resin decorating layer of the skin material S have a relationship of $Tcc \geq Tsm$ and $Tcc \geq Tgs$, a high-quality resin multilayer molded product can be obtained without deteriorating the target surface decorating performance. Furthermore, the process of integration of the skin material S and the core-material resin Q and molding of the core-material resin Q can be performed separately from the self restoration process (damage prevention process) of the resin decorating layer of the skin material S. Therefore, a high dimensional precision without any deformation or warpage is compatible with a high surface decorating performance. Incidentally, the resin decorating layer of the skin material is heated after forming in this embodiment, but the air insulating layer may be formed simultaneously with heating of the resin decorating layer. Alternatively, after the resin decorating layer of the skin material is heated, the formation of the sir insulating layer may be performed. Moreover, heating may be continued even after the formation of the air insulating layer, or interrupted or intermittently performed.

[Sixth Embodiment]

Successively after the process of forming the air insulating layer of the fifth embodiment, as shown in FIG. 13, upon receipt of timing command (3) preset within a temperature range of $Tsc \geq Tgs$ by the clamping condition setting section 68, the mold is closed to eliminate the air insulating layer and obtain a clamped state. Subsequently, after the elapse of cooling time (CT3) preset by the clamping condition setting section 68, mold opening operation is performed to take a molded product out. Additionally, the clamping force may be controlled to change in multiple stages in the clamped state. In the method, the effect described in the fourth embodiment is more remarkably realized. Specifically, a resin multilayer molded product having a high surface gloss without any tarnish or a resin multilayer molded product uniformly embossed over the entire surface can be obtained.

Figure 3:
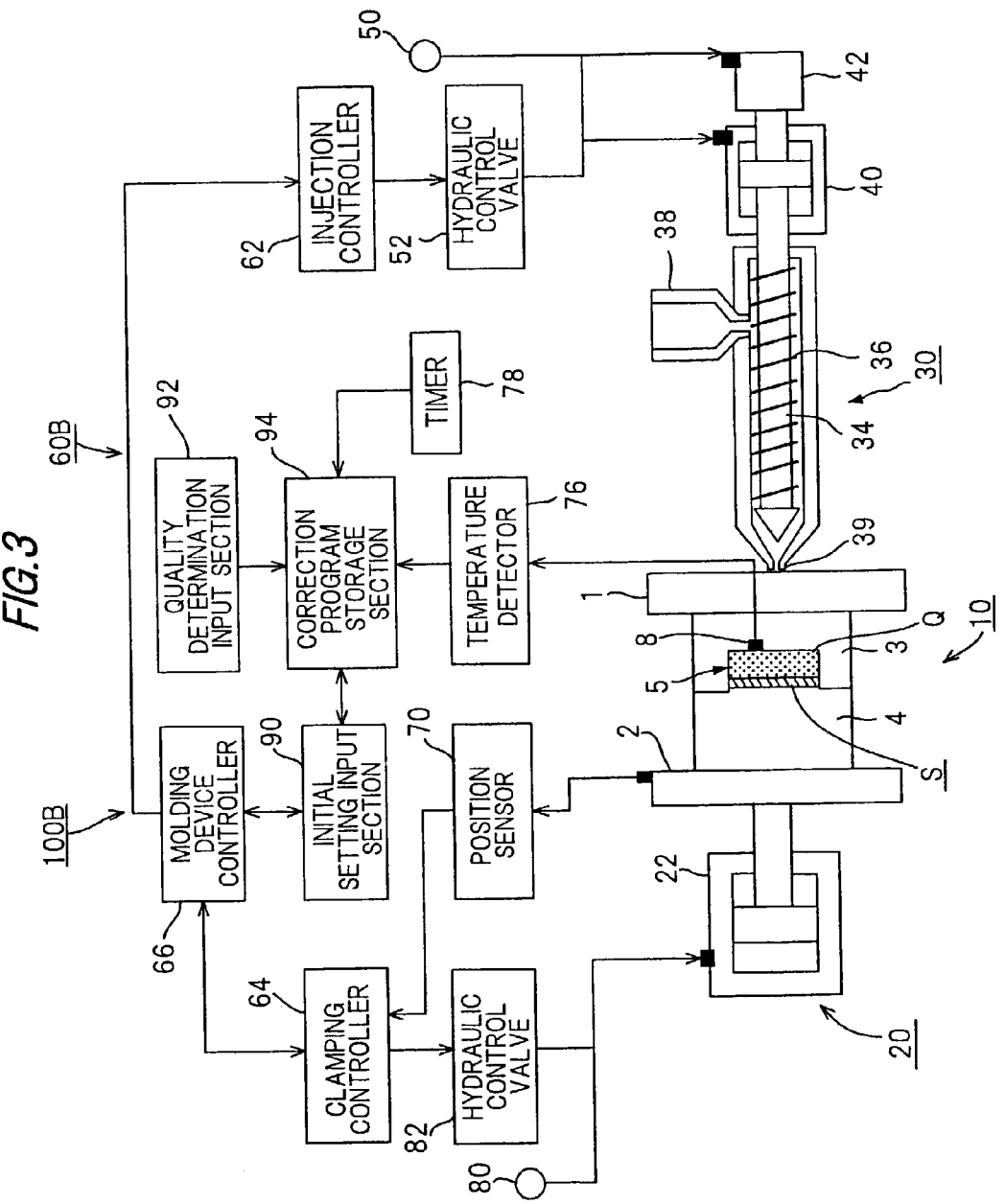
FIG. 3 is a block diagram of the entire constitution of an injection molding machine according to further embodiment of the present invention.

FIG. 3 will next be described.

As shown in FIG. 3, a resin multilayer molding device 100B of the present invention uses a general-purpose injection molding machine, and is constituted of a mold device 10, a clamping device 20, an injection device 30 and a control device 60B. The mold device 10 is constituted of a fixed mold 3 attached to a fixed board 1 and a movable mold 4 attached to a movable board 2, and the movable board 2 and the movable mold 4 can be advanced or retreated by a clamping cylinder 22 of the clamping device 20.

The clamping device 20 is provided with the clamping cylinder 22 for opening or closing the molds 3 and 4 of the mold device 10, and the movable mold 4 can be guided by a tie bar (not shown) to advance or retreat relative to the fixed mold 3.

In the injection device 30, a screw 34 provided with a. spirally attached screw flight 36 can rotate and advance or retreat freely in a barrel 32. When the screw 34 is operated by a hydraulic motor 42 to rotate, resin pellets supplied to a hopper 38 are fed to the front of the screw 34. During this operation, the resin pellets are heated by a heater (not shown) attached to an outer peripheral face of the barrel 32 while molten under kneading action of the rotating screw. The molten resin fed to the front of the screw 34 is pushed out toward a through nozzle 39 by the screw 34 operated by an injection cylinder 40 to advance, and injected into a mold cavity 5 formed between the molds 3 and 4 via the nozzle 39.

The control device 60B will next be described. As diagrammatically shown in FIG. 3, the control device 60B is constituted of an injection controller 62, a clamping controller 64, a molding device controller 66, a position sensor 70, a timer 78, an initial setting input section 90, a quality determination input section 92 and a correction program storage section 94.

The injection cylinder 40 and the forward/reverse rotational hydraulic motor 42 are controlled by a hydraulic control valve 52 having received an operation command from the injection controller 62 to advance and rotate the screw. The molding device controller 66 connected to the injection controller 62 is also connected to the clamping controller 64.

Temperature information of the core-material resin Q measured by a temperature sensor 8 is transferred to the correction program storage section 94 via the temperature detector 76 through an electrical or mechanical connection. The initial setting input section 90 is connected to the correction program storage section 94, and the correction program storage section 94 is connected to the quality determination input section 92 and the timer 78.

Information measured by the position sensor 70 attached to the moving platen 2 is transferred via the clamping controller 64 to give an operation command to the molding device controller 66, and also transferred to the clamping condition setting section 68 and the timer 78 through an electrical or mechanical connection. Furthermore, the clamping controller 64 transmits a signal to the clamping cylinder 22 of the clamping device 20 via a hydraulic control valve 82. Additionally, numeral 50 denotes a hydraulic supply on an injection circuit side, and 80 denotes a hydraulic supply on a clamping circuit side.

[Seventh Embodiment]

Figure 14:
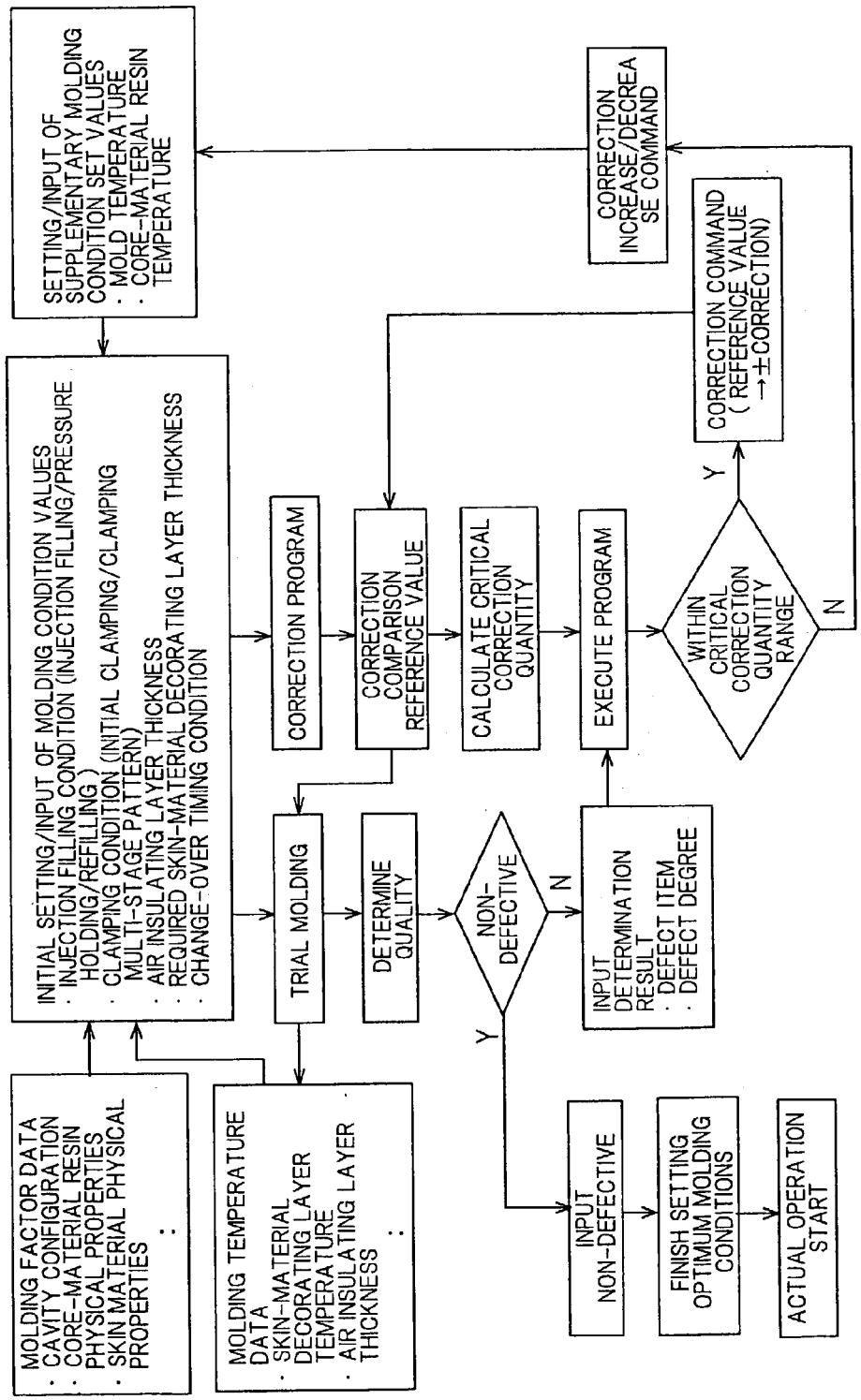
FIG. 14 is a flowchart for performing molding of a seventh embodiment using the resin molding device shown in FIG. 3.

A molding method of a seventh embodiment shown in FIG. 14 will be described using the resin multilayer molding device 100B shown in FIG. 3. To perform the resin multilayer molding of the first to third embodiments, molding factor data constituted of a mold cavity configuration, core-material resin physical properties, a skin-material constitution, resin decorating layer physical properties, and the like are input beforehand. Supplementary molding condition set values constituted of a mold temperature, a core-material resin temperature, and the like are also set and input. Additionally, molding conditions such as the injection filling condition (injection filling, pressure holding/refilling), the clamping condition (initial clamped state, clamping multi-stage control pattern during molding), the air insulating layer thickness, the thickness of the resin decorating layer of the skin material S after molding which satisfies the target surface decorating performance, and the change-over timing condition are initially set and input into the initial setting input section 90. Moreover, in the initial setting of the molding conditions, approximate values acknowledged by an operator in a common-sense range in operation may be set. The values are automatically corrected to optimum molding condition values through the subsequent correction operation by a correction program described later. Therefore, special knowledge, experience or skill is unnecessary, and anyone can perform the setting.

Furthermore, for defect items and degrees obtained from results of visual quality determination by the operator, a correction program is prepared beforehand based on the preset correction direction and quantity, and input into the correction program storage section 94. The correction program is provided with a function of selecting an item needed to be corrected from the initially set molding condition values; a function of correcting the set value of the selected set item; and a function of emitting an operation command to change the supplementary molding conditions constituted of the mold temperature, the core-material resin temperature, and the like when the corrected set value reaches the preset critical correction value.

Trial molding is performed using either of the molding methods of the first to fourth embodiments. During the molding, the temperature of the core-material resin Q or the temperature of the resin decorating layer of the skin material S (in this case, the temperature sensor 8 is also disposed on the side of the resin decorating layer of the skin material S) is detected by the temperature detector 76, and entered into the correction program storage section 94. Additionally, the operator visually determines the quality of a resulting molded prototype after the molding, and inputs a quality determination result (a non-defective or a defective, defect item and degree in a case of the defective). Based on the input quality determination result, in the case of the defective, the initially set molding condition set value is corrected according to the correction program, and the trial molding is performed again using the corrected molding condition set value (corrected comparison reference value). The operation is repeated afterwards until the non-defective is obtained as the result of the quality determination by the operator. When the quality determination gives a result of the non-defective, the molding condition set value corrected at the time becomes an optimum molding condition set value. The setting operation is thus completed and shifts to an actual operation.

Additionally, for the defect items of the quality determination results, for example, items indicating core-material resin molding defects such as generation of burr, short shot, deformation, warpage, and the like, and items indicating deterioration of the surface decorating performance such as damage on the skin material can be entered.

The correction program absorbs the thinking of the molding principle according to the present invention that the damaged resin decorating layer of the skin material S is restored by forming the air insulating layer or that the transfer properties of the cavity surface can be enhanced by the subsequent clamping. Consequently, the optimum molding conditions for the contradictory and remarkably difficult molding controls for the molding of the core-material resin Q and the prevention of the skin material S from being damaged can be easily set.

The correction item of the initial molding condition set value is selected and the correction direction (increase or decrease) and quantity are calculated based on the correction program. In a case where the resin multilayer molding method of the second embodiment is used, for example, for "the damage of the skin material" in the defect items, by correcting the temperature setting in the change-over timing condition for forming the air insulating layer and raising the temperature of the core-material resin Q or the resin decorating layer of the skin material S, the damage restoring capability is enhanced. On the other hand, since the cooling/solidification state (moldability) of the core-material resin is deteriorated, correction is made in a direction in which the pressure holding/refilling force is enhanced to compensate for the deterioration of the moldability. Furthermore, by making correction in a direction in which the thickness of the air insulating layer is increased, the entire molding balance is finely adjusted, and the restoration space of the resin decorating layer of the skin material S is enlarged. Additionally, for example, for "the generation of burr" related with the moldability of the core-material resin Q, the injection filling quantity of the core-material resin is corrected in a decrease direction, and the injection filling condition (pressure, speed or the like) and the clamping force in the initial clamped state are corrected in an increase direction, to make fine adjustment.

Furthermore, the correction program is provided with a function of calculating the critical correction quantity on the basis of an initial set value which is set simultaneously with the initial setting/input of molding condition values, and of avoiding a conditioning error of an infinite loop by repetition of correction. Specifically, in a case where the correction is repeated until the correction quantity reaches the critical correction quantity, for example, in a case where the temperature of the mold or the core-material resin Q as the supplementary molding condition set value is set extremely low, the reduction of the temperature region in which the rubber-like elasticity is shown (excess reduction of the optimum molding condition range) is supposed to be caused by insufficient heating of the resin decorating layer of the skin material S during molding. It is judged that the setting of the supplementary molding condition set value rather than the molding condition set value is incorrect, and a correction increase/decrease command is issued. In this case, the supplementary molding condition set value is corrected, so that the condition error by the infinite loop is avoided.

In the method, even an insufficiently skilled operator can easily set the optimum molding conditions, and no fluctuation of molded product quality by a difference in operator's skill is generated. Furthermore, the automating of optimum molding condition setting and the reduction of conditioning time enhance productivity or produce other effects. As a result, more stable supply of remarkably high-quality resin multilayer molded products can be realized without deteriorating the target surface decorating performance, and cost saving can be realized by the enhancement of productivity.

[Eighth Embodiment]

Figure 15:
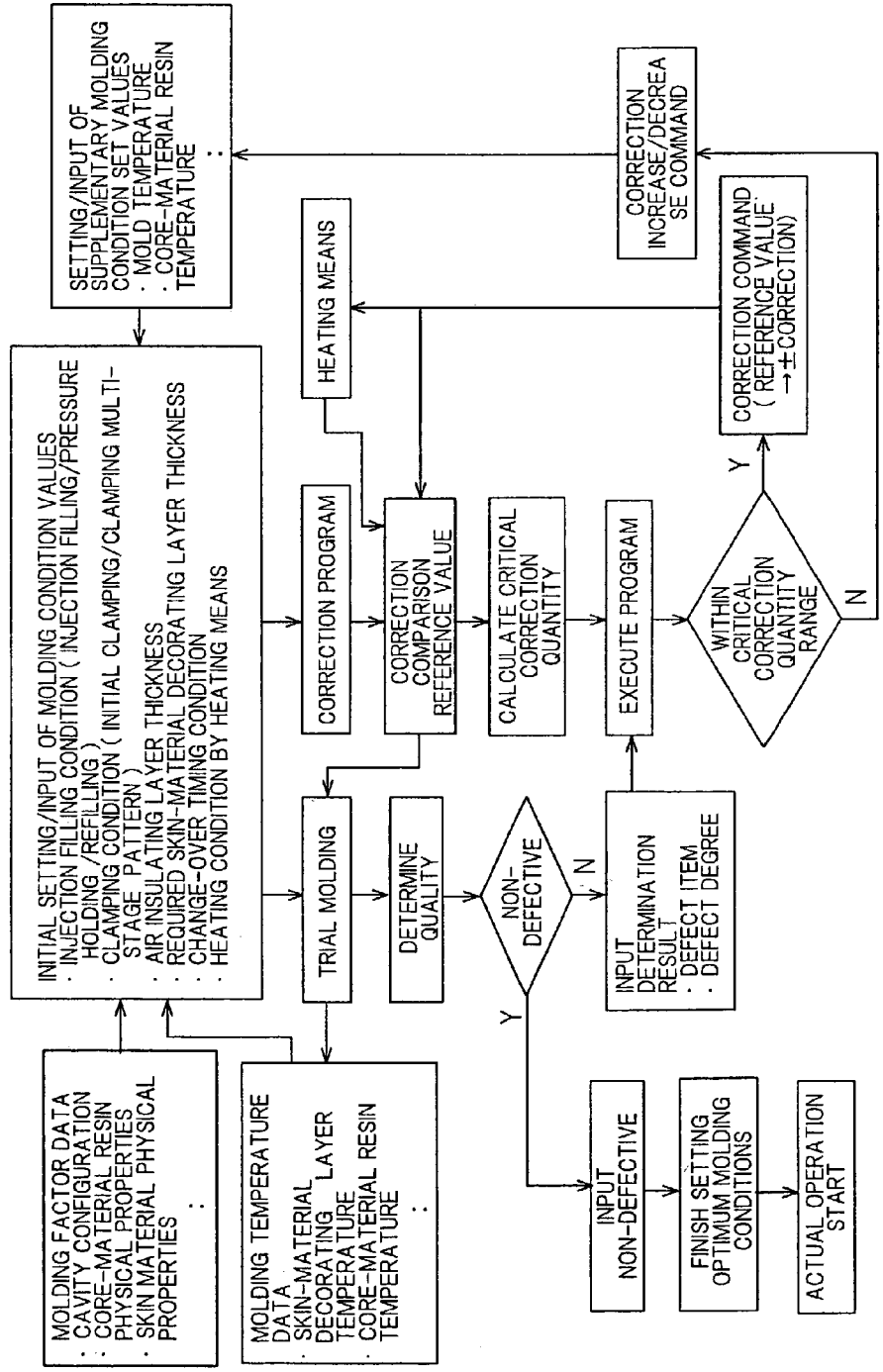
FIG. 15 is a flowchart for performing molding of a eighth embodiment using the resin molding device shown in FIG. 3.

An eighth embodiment will be described with reference to FIG. 15. When the resin multilayer molding of the fifth or sixth embodiment is performed, molding data and supplementary molding condition set values are preset and input, and molding condition set values are initially set and input. The resin multilayer molding device, the contents of set values, the setting method and the content of the correction program are the same as those of the seventh embodiment, except in that heating means and condition are added as set items to the initial setting condition values.

Trial molding is performed using the molding method of the fifth or sixth embodiment. The subsequent quality determination and result input by an operator, the correction rule, and the like are the same as those of the seventh embodiment, except in that the correction program includes correction conditions for the heating means and condition.

The correction item is selected from the initial molding condition set values and the correction direction (increase or decrease) and quantity are calculated based on the correction program. In a case where the resin multilayer molding method of the fifth embodiment is used, for example, for "the damage of the skin material" in the defect items, by correcting the temperature setting in the condition of heating by the heating means and by raising the heating temperature of the resin decorating layer of the skin material S, the damage restoring capability is improved. Furthermore, by making correction in a direction in which the thickness of the air insulating layer is increased, the restoration space of the resin decorating layer of the skin material S is enlarged, and the entire molding balance is finely adjusted. Moreover, for example, for "deformation/warpage" related with the moldability of the core-material resin Q, the change-over timing condition for forming the air insulating layer is corrected in a delaying direction to enhance the moldability of the core-material resin Q (the entire molded product). Additionally, the injection filling condition (pressure, speed, or the like) and the clamping force in the initial clamped state are corrected in an increasing direction to make fine adjustment.

In the method, in the same manner as in the seventh embodiment, the optimum molding conditions can be easily set irrespective of the operator's skill, and no fluctuation of molded product quality is generated. Furthermore, the automating of optimum molding condition setting and the reduction of conditioning time enhance productivity or produce other effects. In the embodiment, after the integration of the skin material S and the core-material resin Q and the molding of the core-material resin Q are completed, the complete self restoration of the resin decorating layer of the skin material S can be attained by the heating process and the formation of the air insulating layer. Therefore, the optimum molding conditions can be set simpler and quickly, and the selection range of the combination of the skin material S and the core-material resin Q can be enlarged.

[Ninth Embodiment]

Figure 4:
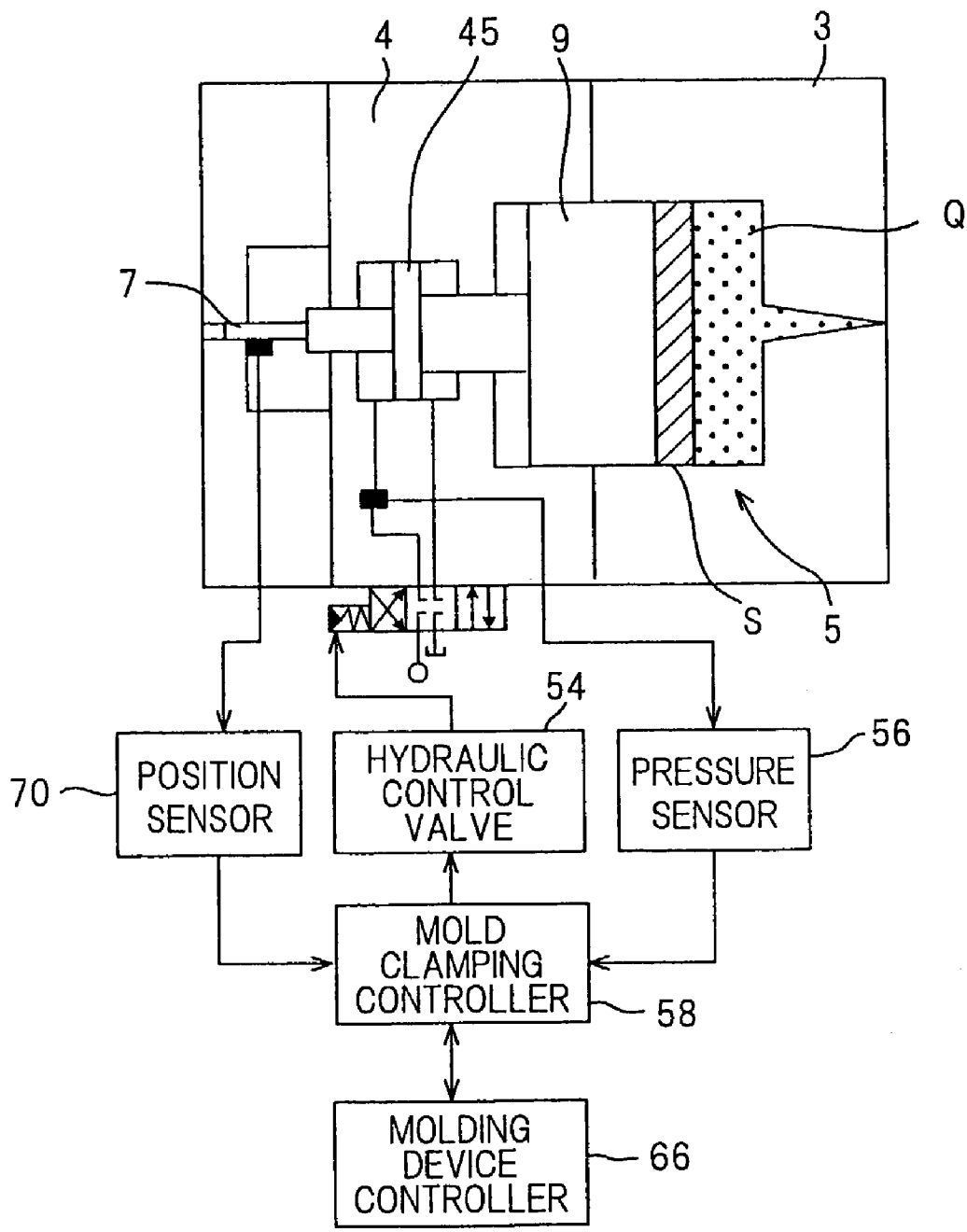
FIG. 4 is an explanatory view showing that an air insulating layer is formed in a mold to perform multilayer molding.

To perform the resin multilayer molding of the first to eighth embodiments, the air insulating layer may be formed, the initial clamped state may be obtained and the multi-step clamping control during molding may be performed using, for example, a mold device shown in FIG. 4.

FIG. 4 shows a case where air insulating layer forming means is disposed in a mold. For example, a guide rod 7 is fixed on the same axis as that of a hydraulic cylinder 45 on the rear face of the hydraulic cylinder 45 connected to a slidable cavity core 9 in the moving side mold 4.

A position sensor 70 for detecting stroke of the hydraulic cylinder 45 and a pressure sensor 56 for detecting supply hydraulic pressure (clamping force) are also provided. The clamping force during molding and the air insulating layer are formed by controlling the pressure and position of the hydraulic cylinder 45.

The hydraulic cylinder 45 is advanced or retreated by switching a hydraulic control valve 54. Additionally, a mold clamping controller 58 is connected to the position sensor 70, the pressure sensor 56 and a molding device controller 66.

In a case where multilayer molding is performed using the mold device shown in FIG. 4, the change-over timing conditions for forming and eliminating the air insulating layer, the initial clamping condition, the multi-step clamping control pattern condition, and the like are set by the mold clamping controller 58 via the molding device controller 66.

In the method, for example, even if the molding device is not provided with the means for forming the air insulating layer, obtaining the initial clamped state and controlling clamping in multiple stages during molding, contradictory molding controls for the formation of the core-material resin Q and the damage prevention of the skin material S can be achieved simultaneously in a series of molding processes. Stable supply of high-quality resin multilayer molded products can be realized without deteriorating the target surface decorating performance.

Additionally, the cavity core 9 with the mold cavity surface formed thereon is advanced or retreated by the hydraulic cylinder or the like incorporated inside the mold, but the moving side mold 4 may be entirely operated, for example, by attaching a pressure block or the like including an advancing/retreating unit to the outside of the mold.

[Tenth Embodiment]

Figure 5:
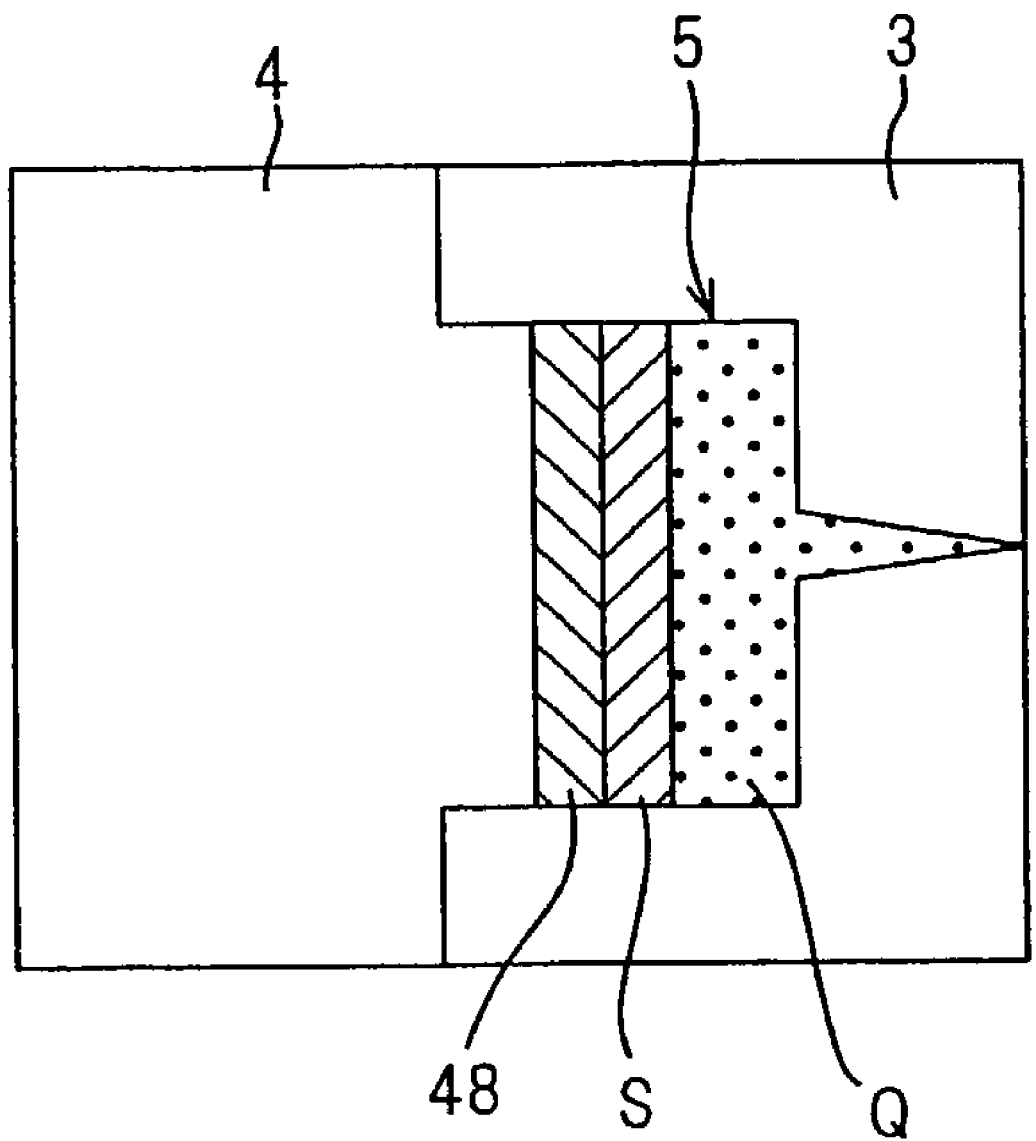
FIG. 5 is a vertical sectional view showing that a mold cavity surface opposed to a resin layer of a skin material has an insulating cavity structure.

When the resin multilayer molding of the first to eighth embodiments is performed, a mold structure may be used in which, as shown in FIG. 5, an insulating cavity layer 48 is formed on the mold cavity surface opposed to the resin decorating layer of the skin material S.

FIG. 5 shows an example in which the mold cavity surface opposed to the resin decorating layer of the skin material S has an insulating cavity structure, and in the insulating cavity structure, the insulating layer is formed of, for example, a metal having a low thermal conductivity, a ceramic, a resin, or the like.

In the method, the resin decorating layer of the skin material S during molding is highly effectively retained in a stable temperature condition of Tgs or more for a long time, and self restoring capability can further be enhanced. Especially, in the molding method in which the mold is closed again after the air insulating layer is formed, since the temperature of the resin decorating layer of the skin material S can be prevented from lowering by the insulating cavity surface, this remarkable effect contributes to the enhancement of molded product quality.

Moreover, even when the temperature of the mold cavity surface opposed to the resin decorating layer of the skin material S is retained by inserting a heat pipe into the mold to heat the mold, circulating heating medium through a heating medium circulation hole formed inside the mold to heat the mold, induction-heating the mold with induction heating means disposed outside, or by another means, the same effect can be obtained.

[Other Modifications]

Besides the resin multilayer molding methods shown in the first to tenth embodiments described above, following molding methods may be performed together with any one of the embodiments described above or singly. For example, by using a plurality of injection devices which can inject/fill a plurality of types of core-material resin Q simultaneously, the skin material S having decorating performance can be simultaneously integrally molded on the surface of the core-material resin Q laminated in multiple layers. In this method, a resin multilayer molded product provided with multi-function characteristics which cannot be fulfilled by the single-layer core-material resin Q can be obtained.

Moreover, in a case where the multilayered core-material resin Q including a foaming resin is used, by restoring the damaged resin decorating layer of the skin material S and simultaneously controlling the thickness of the air insulating layer in a process of forming the air insulating layer, the foaming magnification of the foaming resin can be controlled, and the foaming molding of the foaming resin can be performed in a series of molding processes.

In the aforementioned first to tenth embodiments, the skin material S is integrally molded on one surface of the core-material resin Q, but may be integrally molded on the opposite surfaces or the entire surface of the core-material resin Q. Additionally, besides the resin, for example, a metal film or a painting agent may be applied to the surface or intermediate decorating layer portion of the resin decorating layer of the skin material S as needed.

The resin decorating layer of the skin material S is heated/processed by the heating means 59 in a series of molding processes in the molding method of the fourth embodiment but, for example, even by using a hot-air heating oven or another heating means to heat/process the molded product after molding and separately from the molding processes, the self restoration effect of the resin decorating layer of the skin material S can be obtained in the same manner. This case, however, has demerits that a heating device separate from the molding device is necessary and that time is wasted because the completely cooled molded product needs to be heated from a normal temperature to a predetermined temperature, but has a merit that a large number of molded products can be stocked to be heated/processed in a batch.

Additionally, after the heating processing is performed in a separate process, the molded product may be press-molded, for example, with a separate press device or the like. In this case, the effect described in the molding method of the fifth embodiment can be expected.

In the molding methods of the above first to tenth embodiments, for example, a rust proof lubricant may be applied beforehand to the mold cavity surface opposed to the resin decorating layer of the skin material S. In this case, the applied rust proof lubricant enters recesses in a microscopic irregular surface of the mold cavity surface, and the mold cavity surface can be entirely smoothed as if there is no irregularity. Therefore, frictional scratches are effectively prevented from being made by deforming/sliding of the skin material being molded. Especially, in the molding methods of the third and fifth embodiments, by applying the rust proof lubricant in the clamping process after the formation of the air insulating layer to effectively smooth the cavity face, the molded product quality can further be enhanced.

Additionally, the rust proof lubricant is oil such as a mineral oil, a vegetable oil, and the like; glycerin or alcohol; or water or aqueous solution, and is a liquid or a mixed liquid which can exist in the recesses of the microscopic irregular surface of the mold cavity surface as liquid without being evaporated by the temperature during molding.

The above-mentioned first to tenth embodiments are molding methods or devices related to the integral molding of the skin material S and the core-material resin Q, but the molding method and device of the present invention can be applied to the molding of only the core-material resin Q including no skin material S. In this case, the residual stress (residual strain) of the core-material resin Q generated in the injection filling and pressure holding/cooling processes can be eliminated by forming the air insulating layer. As a result, a high-quality molded product having no deformation or warpage can be obtained. Moreover, by both the formation of the air insulating layer and the subsequent clamping operation, a high-quality molded product can be obtained which has an enhanced transferability of the mold cavity face, high surface properties and a high dimensional precision.

By using the resin multilayer molding method and device according to the present invention, for any type of skin material in which the resin decorating layer formed by laminating in accordance with the surface decorating purpose the surface decorating layer portion constituted of a resin film, a woven fabric, a nonwoven fabric made of polymer fiber singly or in a combined manner and the intermediate decorating layer portion constituted of a foaming resin on the back surface of the surface decorating layer portion as needed, and the base layer constituted of a resin film, a woven fabric, a nonwoven fabric or a combination thereof as needed are laminated, the contradictory molding controls for the molding of the core-material resin and the damage prevention of the decorating skin material can be simultaneously achieved in a series of molding processes. Additionally, remarkably high-quality multilayer molded products can be supplied stably at low cost without deteriorating the target surface decorating performance.

What is claimed is:

1. A resin multilayer molding device in which a skin material having a resin decorating layer on a surface and a core-material resin are integrally molded in a mold, comprising:

carrying means for carrying and setting the skin material to a predetermined position of a mold cavity and carrying a molded product to a predetermined position after molding, and supply means for supplying a molten resin forming a core material into a mold cavity space; and a clamping condition setting section for setting/entering a clamping condition and a thickness of an air insulating layer during supply and after supply of the molten resin, a change-overtiming setting section for a change-overtiming condition for forming the air insulating layer, a temperature detecting section for detecting a temperature of the core-material resin and a temperature of the resin decorating layer of the skin material during molding, a comparison control section for comparing/determining a detection signal of the temperature detecting section and a set value of the change-over timing setting section, and a clamping control section for controlling clamping means based on a signal of the comparison control section and a set value of the clamping condition setting section.

2. A resin multilayer molding device in which a skin material having a resin decorating layer on a surface and a core-material resin are integrally molded in a mold, comprising:
carrying means for carrying/setting the skin material to a predetermined position of a mold cavity and carrying a molded product to a predetermined position after molding, and supply means for supplying a molten resin forming a core material into a mold cavity space; and
a change-over timing setting section for a change-over timing condition for forming the air insulating layer and a change-overtiming condition for eliminating the air insulating layer, a temperature detecting section for detecting a temperature of the core-material resin and a temperature of the resin decorating layer of the skin material during molding, a comparison control section for comparing/determining a detection signal of the temperature detecting section and a set value of the change-over timing setting section, and a clamping control section for controlling clamping means based on a signal of the comparison control section and a set value of the clamping condition setting section.

3. The resin multilayer molding device according to claim 1 wherein the multilayer molding device further comprises an injection molding device.

4. The resin multilayer molding device according to claim 2 wherein the multilayer molding device further comprises an injection molding device.

5. The multilayer molding device according to claim 1 which comprises:
an initial setting input section for initially setting/entering as molding condition values an injection filling condition for injection filling the molten resin forming the core material into the metal-mold cavity space and refilling a cooling/solidification shrinkage quantity, a clamping condition during the injection
filling, the thickness of the air insulating layer, and the change-over timing condition for forming the air insulating layer;
a molding device control section for operating/controlling the multilayer molding device for performing resin multilayer molding based on set values of the initial setting input section, a quality determination input section for entering visual quality determination results; and
a correction program storage section for correcting the initially set molding condition values based on input values of the quality determination input section to set optimum molding conditions for preventing the resin decorating layer of the skin material being molded from being damaged.

6. A resin multilayer molding device in which a skin material having a resin decorating layer on a surface and a core-material resin are integrally molded in a mold, comprising:
carrying means for carrying and setting the skin material to a predetermined position of a mold cavity and carrying a molded product to a predetermined position after molding, and supply means for supplying a molten resin forming a core material into a mold cavity space; and
a clamping condition setting section for setting/entering a clamping condition and a thickness of an air insulating layer during supply and after supply of the molten resin, a change-overtiming setting section for a change-overtiming condition for forming the air insulating layer, said change-overtiming control timer which starts at an arbitrary time during molding and a clamping control section for controlling clamping means based on a time-out signal of the timer.

7. A resin multilayer molding device in which a skin material having a resin decorating layer on a surface and a core-material resin are integrally molded in a mold, comprising:
carrying means for carrying and setting the skin material to a predetermined position of a mold cavity and carrying a molded product to a predetermined position after molding, and supply means for supplying a molten resin forming a core material into a mold cavity space; and
a clamping condition setting section for setting/entering a clamping condition and a thickness of an air insulating layer during supply and after supply of the molten resin, a change-overtiming setting section for a change-overtiming condition for forming the air insulating layer and a change-over timing condition for eliminating the air insulating layer, said change-over timing control timer which starts at an arbitrary time during molding and a clamping control section for controlling clamping means based on a time-out signal of the timer.

8. The resin multilayer molding device according to claim 1 wherein means for forming the air insulating layer is incorporated into the mold.

9. The resin multilayer molding device according to claim 2 wherein the insulating cavity layer is formed on the resin decorating layer of the skin material and the mold cavity surface opposed to the resin decorating layer.

* * * * *